United States Patent
Watanabe et al.

(10) Patent No.: US 7,505,955 B2
(45) Date of Patent: Mar. 17, 2009

(54) INFORMATION TERMINAL AND CONTENT STORAGE/PLAYBACK METHOD

(75) Inventors: Keiko Watanabe, Fuchu (JP); Jun Sato, Kawasaki (JP); Toru Terauchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 364 days.

(21) Appl. No.: 11/090,996

(22) Filed: Mar. 24, 2005

(65) Prior Publication Data

US 2006/0129514 A1    Jun. 15, 2006

(30) Foreign Application Priority Data

Dec. 10, 2004    (JP)    ............... 2004-358797

(51) Int. Cl.
G06F 17/30    (2006.01)
H04L 9/00    (2006.01)
H04N 7/167    (2006.01)

(52) U.S. Cl. ............... 707/1; 380/277; 725/25

(58) Field of Classification Search .......... 726/27, 726/31, 29; 713/193, 168, 200, 171, 189, 713/190; 707/1, 100, 104.1; 373/200; 455/550.1, 455/557; 725/25; 380/277, 283
See application file for complete search history.

(56) References Cited

U.S. PATENT DOCUMENTS

| | | | | |
|---|---|---|---|---|
| 7,143,445 B1 * | 11/2006 | Ishiguro et al. | ............... | 726/31 |
| 7,181,628 B2 * | 2/2007 | Sato et al. | ................... | 713/189 |
| 7,191,346 B2 * | 3/2007 | Abe et al. | ................... | 713/194 |
| 7,266,202 B1 * | 9/2007 | Kawakami et al. | .......... | 380/283 |
| 7,350,238 B2 * | 3/2008 | Abe et al. | ..................... | 726/29 |
| 2002/0154779 A1 * | 10/2002 | Asano et al. | ................. | 380/277 |
| 2003/0014630 A1 * | 1/2003 | Spencer et al. | ............... | 713/168 |
| 2003/0061165 A1 * | 3/2003 | Okamoto et al. | .............. | 705/52 |
| 2004/0054678 A1 * | 3/2004 | Okamoto et al. | ............ | 707/100 |
| 2004/0103303 A1 * | 5/2004 | Yamauchi et al. | ............ | 713/200 |
| 2004/0157638 A1 * | 8/2004 | Moran et al. | ............. | 455/550.1 |
| 2004/0193899 A1 * | 9/2004 | Satake et al. | ................. | 713/190 |
| 2004/0210925 A1 * | 10/2004 | Miyazawa et al. | ............ | 725/25 |
| 2005/0021961 A1 * | 1/2005 | Hanks et al. | ................. | 713/171 |
| 2005/0268115 A1 * | 12/2005 | Barde et al. | .................. | 713/189 |
| 2006/0200864 A1 * | 9/2006 | Nakanishi et al. | .............. | 726/27 |

FOREIGN PATENT DOCUMENTS

| | | | |
|---|---|---|---|
| JP | 7-131452 | A | 5/1995 |
| JP | 2001-297263 | A | 10/2001 |
| JP | 2002-123265 | A | 4/2002 |
| JP | 2002-244928 | A | 8/2002 |
| JP | 2003-85893 | A | 3/2003 |
| JP | 2003-131950 | A | 5/2003 |
| JP | 2004-48180 | A | 2/2004 |
| WO | WO 00/52581 | A1 | 9/2000 |

* cited by examiner

*Primary Examiner*—Hung T Vy
(74) *Attorney, Agent, or Firm*—Frishauf, Holtz, Goodman & Chick, P.C.

(57) ABSTRACT

An information terminal according to this invention includes a storage means having a first storage area which is accessible from an external terminal, and a second storage area which is inaccessible from the external terminal. Content which includes a content body and rights information indicating a use condition given to the content body is acquired. The acquired content is encrypted and the encrypted content is stored in the first storage area. In addition, state management information used to manage the variable state of the use condition given to the content body is generated on the basis of the rights information included in the acquired content, and the generated state management information is stored in the second storage area.

15 Claims, 15 Drawing Sheets

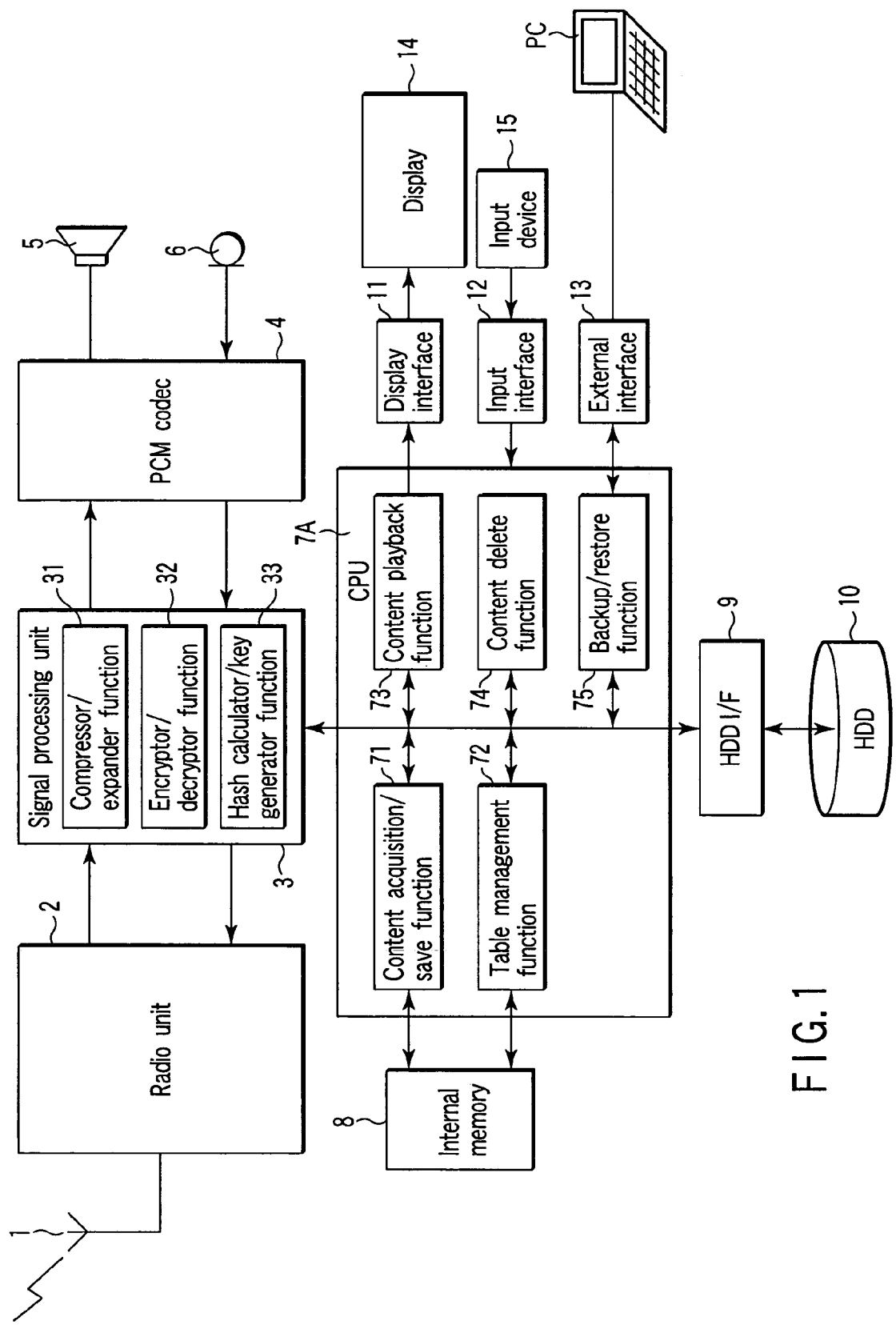
F I G. 1

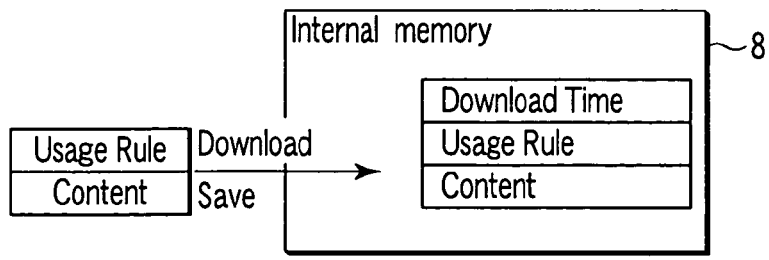
F I G. 7
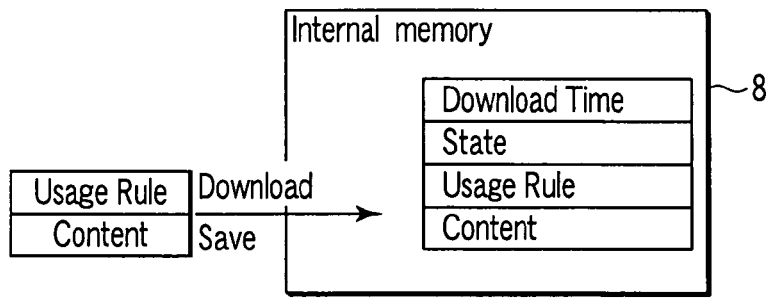
F I G. 8
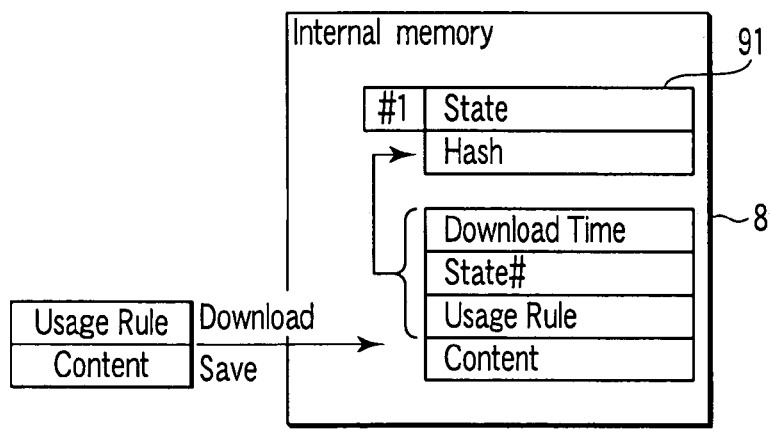
F I G. 9

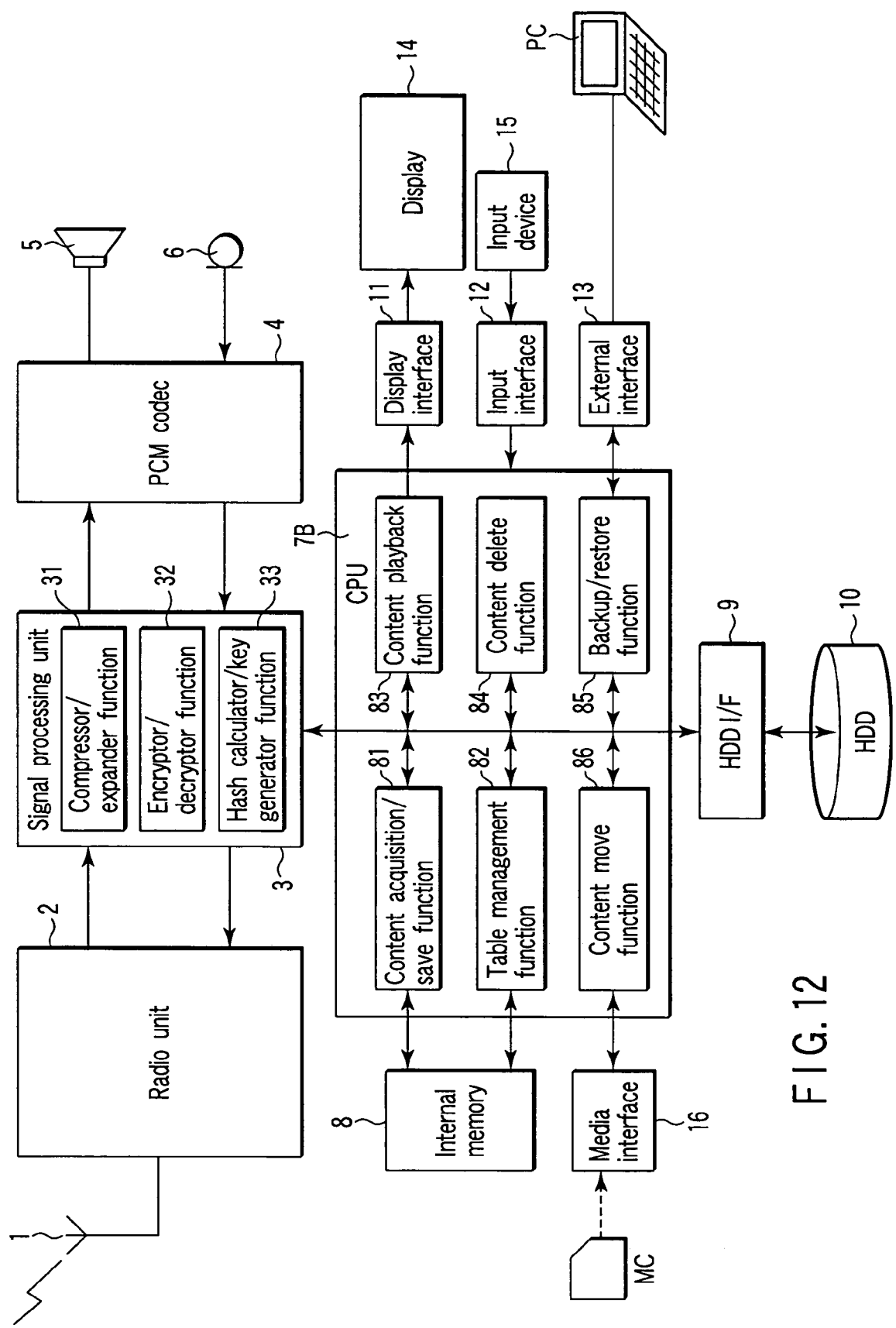
F I G. 12

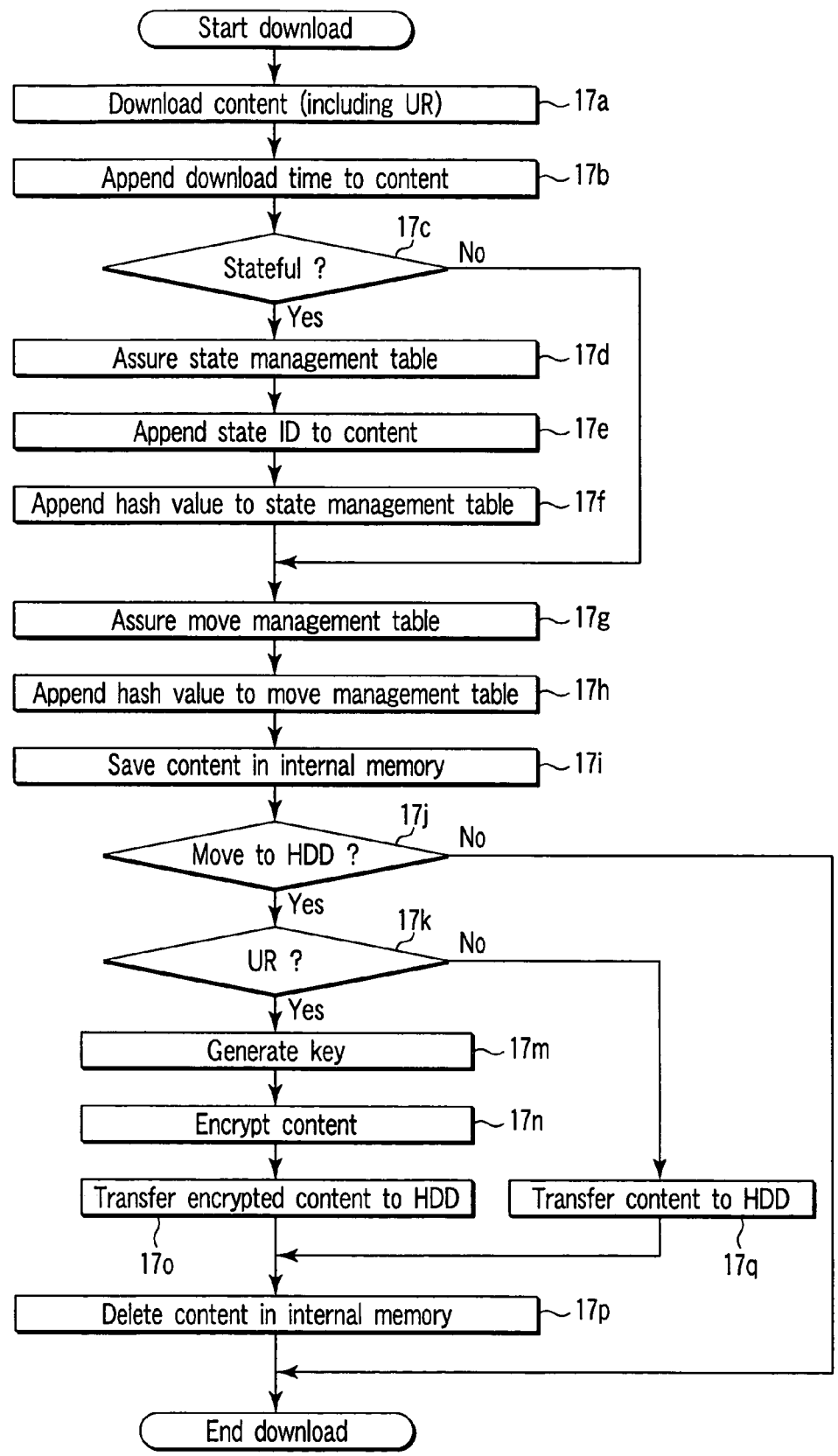
F I G. 17

| | Coexistence with terminal-bound content movement | Coexistence with media-bound content movement | Upon HDD failure | Upon internal memory failure | Model change | State management table | Move management table |
|---|---|---|---|---|---|---|---|
| First embodiment | OK | NG | All contents restorable | Contents other than stateful content restorable | OK using only backup file | Only stateful content | None |
| Second embodiment | OK | OK | All contents restorable | All contents unrestorable | NG using backup file alone | Stateful and stateless contents | None |
| Third embodiment | OK | OK | All contents restorable | All contents unrestorable | NG using backup file alone | Only stateful content | Stateful and stateless contents |

F I G. 23

INFORMATION TERMINAL AND CONTENT STORAGE/PLAYBACK METHOD

CROSS-REFERENCE TO RELATED APPLICATIONS

This application is based upon and claims the benefit of priority from prior Japanese Patent Application No. 2004-358797, filed Dec. 10, 2004, the entire contents of which are incorporated herein by reference.

BACKGROUND OF THE INVENTION

1. Field of the Invention

The present invention relates to an information terminal having a communication function, such as a mobile telephone and personal digital assistant (PDA), and, more particularly, to an information terminal having a function of acquiring content from an information site and storing/playing it back, and a content storage/playback method.

2. Description of the Related Art

In recent years, streaming services that allow users to download rich content such as music from content servers to information terminals have begun to prevail. In the information terminal that utilizes such services, the downloaded content is temporarily stored in memory, and the stored content is read out from memory and played back in accordance with a user's playback operation. Some content is assigned a usage rule indicating the use condition. The usage rule includes a stateless usage rule that does not require management of a variable state, i.e., one that designates a playback validity period, and a stateful usage rule that requires management of a variable state, i.e., one that designates a playback count.

On the other hand, it is proposed to use a hard disk (HDD) as a memory used to store content. When the hard disk is used as the memory, a large amount of content can be stored with lower cost than with use of a flash memory or the like. However, the hard disk is generally vulnerable to shock and easily breaks.

Hence, content stored in the hard disk is backed up to an external storage device. Desirably, one can restore backup files of the content from the external storage device to the hard disk when the content cannot be used due to a problem with the hard disk or the like.

For example, in a known method, when the content server downloads content with the use condition to the information terminal, it appends the network address of a backup server to the content to be downloaded. The information terminal transmits the content to the backup server based on the network address upon backing up the downloaded content. The backup server saves the transmitted content in correspondence with the telephone number of the communication terminal as the transmission source. However, this method requires a dedicated backup server, and equipment investment of the content seller or use condition manager is required accordingly. Note that the technique that uses the backup server is described in detail in Jpn. Pat. Appln. KOKAI Publication No. 2004-48180.

Also, a technique for backing up content stored in a mobile telephone or mobile terminal such as a PDA or the like using a personal computer has been proposed. For example, content stored in a hard disk of a mobile terminal is encrypted together with its usage rule, and the encrypted content including the usage rule is copied to the personal computer intact. When the content is deleted due to a problem with the hard disk or the like, the encrypted content including the usage rule is restored from the personal computer to the hard disk.

However, with the above technique, when the usage rule included in the content is the stateful usage rule, the remaining playback count managed by the mobile terminal does not match that backed up by the personal computer. For this reason, when the backup content is restored to the hard disk, the stateful usage rule cannot be accurately managed.

BRIEF SUMMARY OF THE INVENTION

It is an object of the present invention to provide an information terminal and content storage/playback method, which can manage restored content in accordance with the latest variable state of the use condition managed by the information terminal even when the content is backed up/restored.

In order to achieve the above object, an information terminal according to the present invention has storage means having a first storage area which is accessible from an external terminal, and a second storage area which is inaccessible from the external terminal. Content which includes a content body and a usage rule indicating the content of a use condition corresponding to the content body is acquired, and the acquired content is encrypted and stored in the first storage area. In addition, state management information used to manage the variable state of the use condition given to the content body is generated on the basis of the usage rule included in the acquired content. The generated state management information is stored in the second storage area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below serve to explain the principles of the invention.

FIG. 1 is a block diagram showing the arrangement of an information terminal according to the first embodiment of the present invention;

FIG. 7 is a view for explaining the acquisition/Save operation of content including a stateless usage rule;

FIG. 8 is a view for explaining the acquisition/save operation of content including a stateful usage rule;

FIG. 9 is a view for explaining another example of the acquisition/save process of content including a stateful usage rule;

FIG. 12 is a block diagram showing the arrangement of an information terminal according to the second embodiment of the present invention;

FIG. 17 is a flowchart showing the sequence and content of a content acquisition/save process by the terminal according to the third embodiment of the present invention;

FIG. 23 is a table listing the effects of the first, second, and third embodiments.

DETAILED DESCRIPTION OF THE INVENTION

FIRST EMBODIMENT

Figure 2:
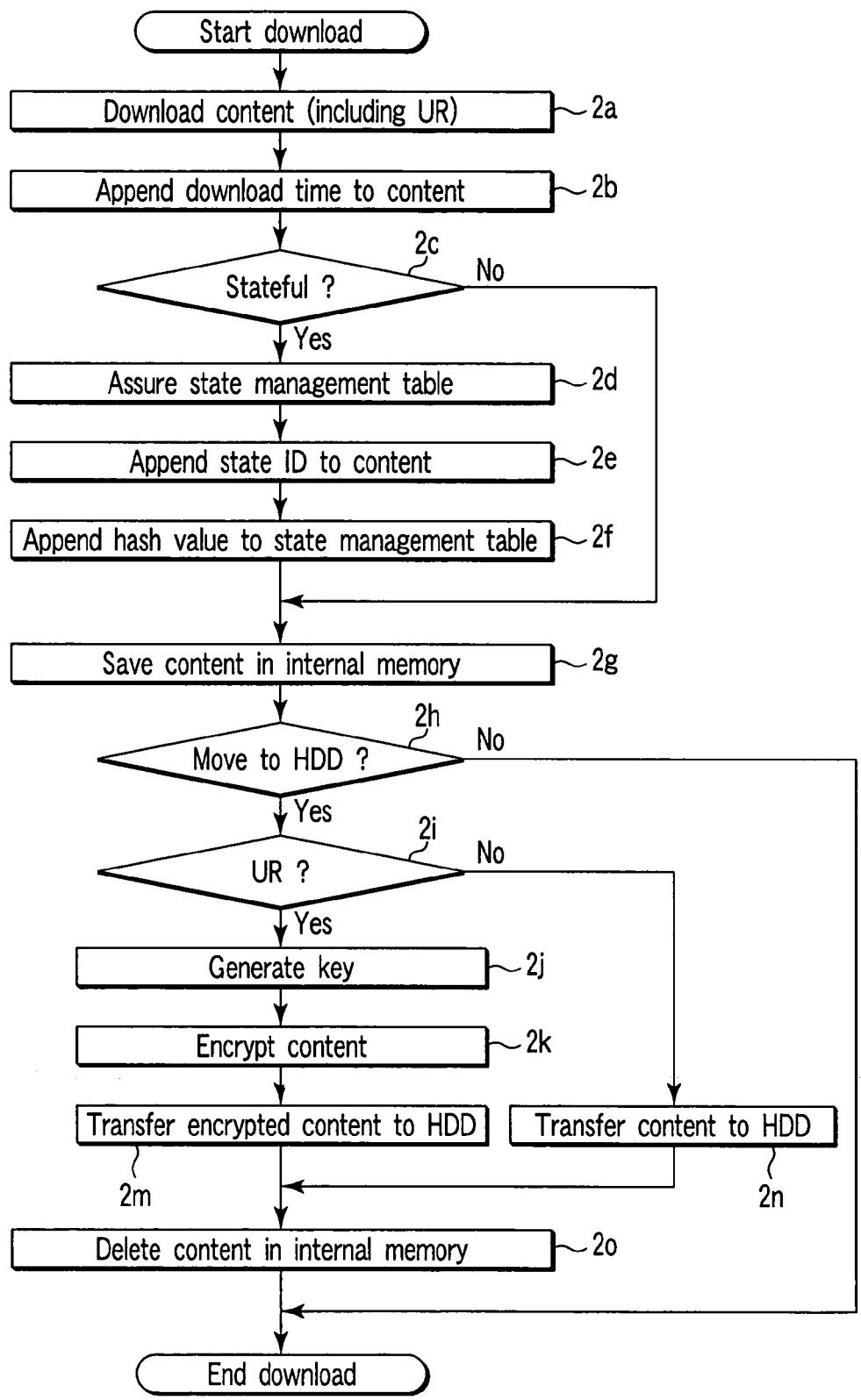
FIG. 2 is a flowchart showing the sequence of a content acquisition/save process by the terminal shown in FIG. 1.

FIG. 1 is a block diagram showing the arrangement of a mobile terminal as the first embodiment of an information terminal according to the present invention.

A radio signal transmitted from a base station (not shown) is received by an antenna 1 and is input to a radio unit 2. The radio unit 2 performs downconversion of the received radio signal, a quadrature demodulation process of the down-converted intermediate frequency signal, despread of respective passes and symbol mixing process of a RAKE receiver, and the like. Received packet data output from the RAKE receiver is input to a signal processing unit 3.

The signal processing unit 3 comprises, e.g., a digital signal processor (DSP), and has a compressor/expander function 31, encryptor/decryptor function 32, and hash calculator/key generator function 33. The compressor/expander function 31 demultiplexes the received packet data for respective media, and decodes the demultiplexed data for respective media. For example, if the received packet data includes audio data, the function 31 decodes this audio data by a speech codec. If the received packet data includes video data, the function 31 decodes this video data by a video codec. Furthermore, if the received packet data is a download content, the function 31 expands this content, and inputs the expanded content to a control unit 7A.

The digital audio data obtained by decoding is PCM-decoded by a PCM encoder/decoder (to be referred to as a PCM codec hereinafter) 4, is amplified by an amplifier (not shown), and is then output from a loudspeaker 5. The digital video signal decoded by the video codec is supplied from the control unit 7A to a display interface 11, and is displayed on a display 14.

On the other hand, a voice signal of a speaker input to a microphone 6 is amplified by an amplifier (not shown) and is PCM-encoded by the PCM codec 4 to obtain a digital audio signal. The digital audio signal is input to the signal processing unit 3. The signal processing unit 3 compresses and encodes the digital audio signal by the compressor/expander function 31. Also, a video signal output from a camera (not shown) and text data such as a mail message created by the control unit 7A are compressed and encoded by the compressor/expander function 31. The compression transmission data are multiplexed to transmission packet data, which is input to the radio unit 2.

The radio unit 2 performs a modulation process of the transmission packet data and up conversion to a radio signal. The modulation process includes a spread spectrum process and a digital modulation process such as quadrature phase-shift keying (QPSK) or the like. The radio transmission signal generated by the up conversion is power-amplified, and undergoes a transmission filtering process. The filtered signal is transmitted from the antenna 1 to the base station.

The mobile terminal has an internal memory 8 and hard disk (HDD) 10 as storage media. Of these media, the internal memory 8 comprises, e.g., an EEPROM, and is set to be inaccessible from an external personal computer PC. By contrast, the HDD 10 is set to be accessible from the external personal computer PC.

The control unit 7A comprises, e.g., a microcomputer (central processing unit [CPU]). The control unit 7A has, as control functions according to the present invention, a content acquisition/save function 71, table management function 72, content playback function 73, content delete function 74, and backup/restore function 75. Note that these functions 71 to 75 are implemented when the CPU executes programs.

The content acquisition/save function 71 downloads a content from a content server (not shown). The content includes a content body and a usage rule indicating the content of its use condition. The function 71 executes a series of processes for saving the downloaded content in the internal memory 8, then encrypting the content, and moving the encrypted content to the HDD 10. Upon saving, a download time is appended to the content. The encryption process is executed by the encryptor/decryptor function 32 of the signal processing unit 3 on the basis of an encryption key. The encryption key is unique to each content, and is generated on the basis of the download time and the telephone number of the mobile terminal. As the encryption scheme, for example, Advanced Encryption Standard (AES) is used.

The table management function 72 creates a state management table used to manage the variable state of the use condition when a stateful usage rule is appended to the downloaded content body. The function 72 stores the created state management table in the internal memory 8 in association with the content. The state management table and content are associated using a state ID (State#). A hash function value is assigned to the state management table. This hash function value is calculated by the hash calculator/key generator function 33 of the signal processing unit 3 on the basis of the download time, state ID (State#), and usage rule. Note that a part of the content body may be considered upon calculating the hash function value.

The backup/restore function 75 executes a process for transferring the encrypted content stored in the HDD 10 to the external personal computer PC and making the personal computer PC to back it up, and a process for transferring the backup content from the personal computer PC to the mobile terminal and restoring it in the HDD 10 as needed. The content is transferred between the mobile terminal and personal computer PC via an external interface 13.

The content delete function 74 executes a process for deleting the encrypted content stored in the HDD 10. A delete mode includes a temporary delete mode for the purpose of temporarily saving the content stored in the HDD 10, and a complete delete mode for the purpose of disabling the content stored in the HDD 10 to play it back. In the temporary delete mode, only the content stored in the HDD 10 is deleted, and the state management table stored in the internal memory 8 is held. In the complete delete mode, both the content stored in the HDD 10 and the state management table stored in the internal memory 8 are deleted.

The content playback function 73 executes processes for playing back the encrypted content stored in the HDD 10. Upon playing back the encrypted content, the function 73 executes a decryption process of the encrypted content, a checking process for checking if the content includes the stateful usage rule, a checking process for checking if the corresponding state management table is saved, a process for calculating the hash function value, and collating it with the hash function value appended to the state management table, and a checking process for checking the authenticity of correspondence between the content to be played back and state ID (State#). Of these processes, the encrypted content decoding process is executed by the encryptor/decryptor function 32 of the signal processing unit 3. Also, generation of an encryption key and the hash function value calculation process are executed by the hash calculator/key generator function 33.

Note that reference numeral 14 denotes a display such as a liquid crystal display; and 15, an input device such as a keypad or the like. The display 14 displays the received information, playback content, operation information of the mobile terminal, and the like, and its display data is supplied via the display interface 11. The input device 15 is used by the user to input operation information such as commands and the like to the mobile terminal. The operation information is input to the control unit 7A via an input interface 12.

The operations of the mobile terminal with the above arrangement will be explained below.

(1) Content Acquisition/Save Operation

The control unit 7A downloads a content from a content server (not shown) in step 2a, as shown in FIG. 2. The content includes a content body and a usage rule indicating the use condition included in this content body. The usage rule includes a stateless usage rule that does not require management of a variable state, i.e., that designates a playback validity period, and a stateful usage rule that requires management of a variable state, i.e., that designates a playback count, as described above. Note that the content and the usage rule indicating the content of its use condition are often downloaded as independent files which are associated with each other.

After the content is downloaded, the control unit 7A appends a download time to the content in step 2b. The control unit 7A checks in step 2c if the format of the usage rule is a stateless usage rule or stateful usage rule. If it is determined as a result of checking that the usage rule is a stateless usage rule, the flow jumps to step 2g to save the content appended with the download time in the internal memory 8 intact, as shown in FIG. 7.

On the other hand, if the usage rule is a stateful usage rule, the control unit 7A assures a state management table in step 2d, and appends state information (e.g., a playback count or remaining playback count [state]) indicating the variable state of the use condition to the content. The control unit 7A generates a state ID (State#) unique to each content, and appends the generated state ID (State#) to the state management table and content in step 2e. That is, the control unit 7A associates the state management table and content with each other by this state ID (State#). In step 2f, the control unit 7A adds a hash function value to the state management table. This hash function value is calculated by the hash calculator/key generator function 33 of the signal processing unit 3 on the basis of the download time and state ID (State#) appended to the content, and the usage rule.

The control unit 7A saves the content appended with the download time and state ID (State#), and the state management table appended with the state information (state), its ID, and hash function value in the internal memory 8 in step 2g. FIG. 9 shows the configuration of the content and a state management table 91 which are saved at that time.

Note that assurance of the state management table, generation and appending of the state ID (State#), and calculation and appending of the hash function value may be made when the content is moved from the internal memory 8 to the HDD 10. FIG. 8 shows the configuration of the content stored in the internal memory 8 in this case. In this way, the storage capacity of the internal memory 8 can be saved until the content is moved to the HDD 10.

For example, when the free capacity of the internal memory 8 becomes lower than a predetermined value while the content and state management table 91 are stored, as described above, it is required to move the content to the HDD 10. In this case, the flow advances from step 2h to step 2i, and the control unit 7A checks if the content includes the usage rule indicating the content of the use condition.

Figure 10:
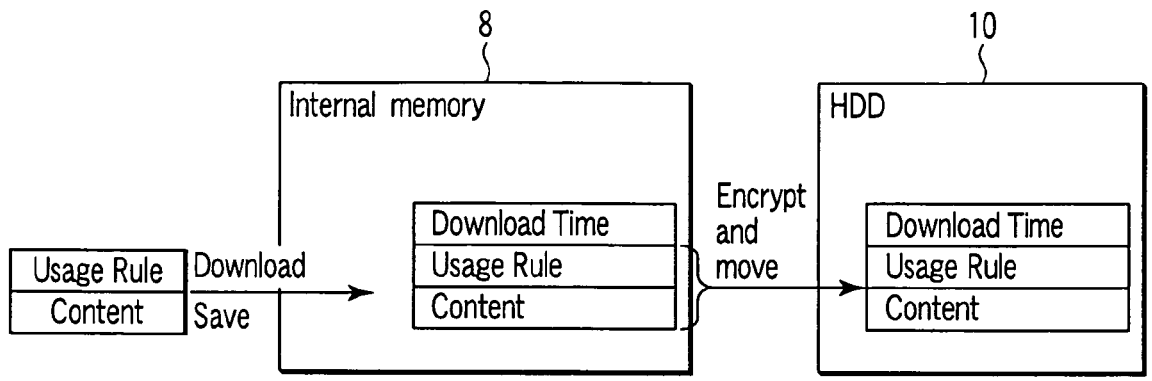
FIG. 10 is a view for explaining an operation for moving a content including a stateless usage rule from an internal memory to an HDD.
Figure 11:
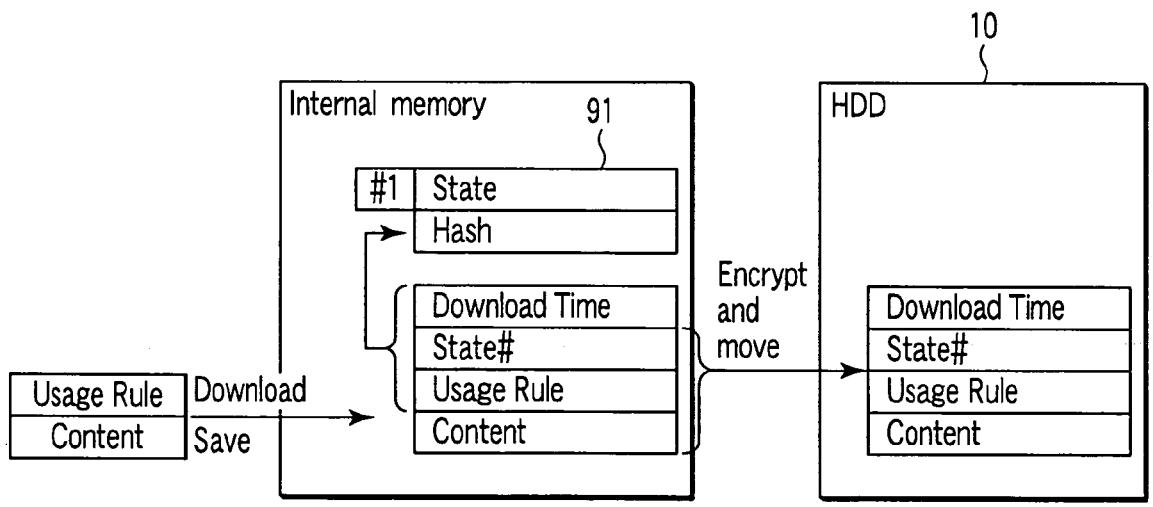
FIG. 11 is a view for explaining an operation for moving content including a stateful usage rule from an internal memory to an HDD.

If it is determined as a result of checking that the content includes the usage rule, the control unit 7A generates an encryption key in step 2j, and encrypts the content body, usage rule, and state ID except for the download time using this encryption key. Then, the control unit 7A moves the encrypted content body, usage rule, and state ID to the HDD 10 in step 2m. After the movement, the control unit 7A deletes the moved download time, content body, usage rule, and state ID from the internal memory 8 in step 2o. FIG. 10 shows the move operation in case of the stateless usage rule, and FIG. 11 shows that in case of the stateful usage rule.

If the content does not include any usage rule indicating the content of the use condition, the flow jumps from step 2i to step 2n, and the control unit 7A moves the content to the HDD 10 without encrypting it. After the movement, the control unit 7A deletes the content from the internal memory 8 in step 2o.

(2) Content Backup/Restore Operation

Figure 3:
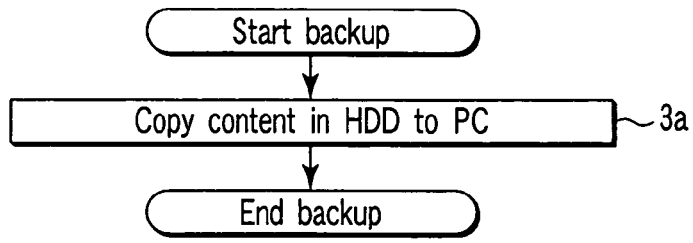
FIG. 3 is a flowchart showing the sequence of a content backup process by the terminal shown in FIG. 1.

Since the HDD 10 is vulnerable to shock and is prone to fail, the content stored in the HDD 10 is backed up by the external personal computer PC. In this case, the personal computer PC is connected to the external interface 13 via a USB cable or the like. The personal computer PC accesses the HDD 10 of the mobile terminal to copy the encrypted content stored in the HDD 10 in step 3a, as shown in FIG. 3.

Figure 4:
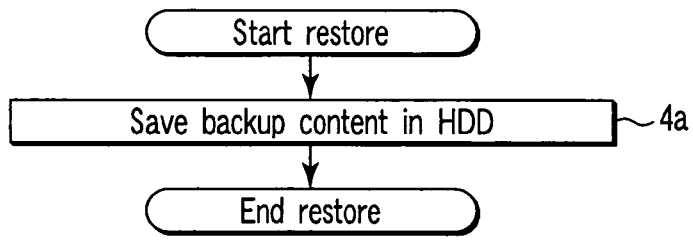
FIG. 4 is a flowchart showing the sequence of a content restore process by the terminal shown in FIG. 1.
Figure 5:
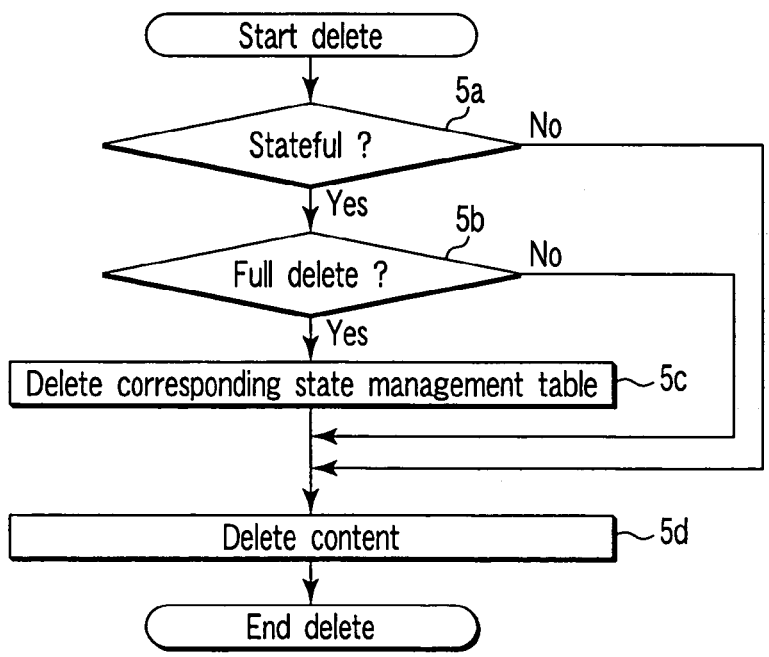
FIG. 5 is a flowchart showing the sequence of a content delete process by the terminal shown in FIG. 1.

When the backup encrypted content is to be restored to the HDD 10 of the mobile terminal, the personal computer PC is connected to the external interface 13 via a USB cable or the like, as described above. After that, the backup file of the content is transferred from the personal computer PC to the mobile terminal and is stored in the HDD 10 in step 4*a*, as shown in FIG. 4.

(3) Delete Operation of Content Stored in HDD 10

When the content stored in the HDD 10 becomes unnecessary and is to be deleted, the control unit 7A checks in step 5*a* if the usage rule included in the content to be deleted is a stateful usage rule. If it is determined as a result of checking that the usage rule is a stateless usage rule, the flow jumps to step 5*d* to delete the target content from the HDD 10.

On the other hand, if the usage rule included in the content to be deleted is a stateful usage rule, the flow advances to step 5*b*, and the control unit 7A checks if the complete or temporary delete mode is set as the delete mode. If the temporary delete mode is set, the flow jumps to step 5*d*, and the control unit 7A deletes the content to be deleted and its additional information (download time and state ID) in the HDD 10 while leaving the state management table in the internal memory 8. Therefore, in this case, when the backup file of the deleted content is restored from the personal computer PC to the HDD 10, the restored content can be played back on the basis of the state management table 91 held in the internal memory 8.

By contrast, if the complete delete mode is set, the control unit 7A deletes the state management table corresponding to the content to be deleted from the internal memory 8 in step 5*c*. The flow then advances to step 5*d*, and the control unit 7A deletes the content to be deleted in the HDD 10. Therefore, in this case, even when the content is restored from the personal computer PC, that content cannot be played back.

(4) Playback Operation of Content Stored in HDD 10

Figure 6:
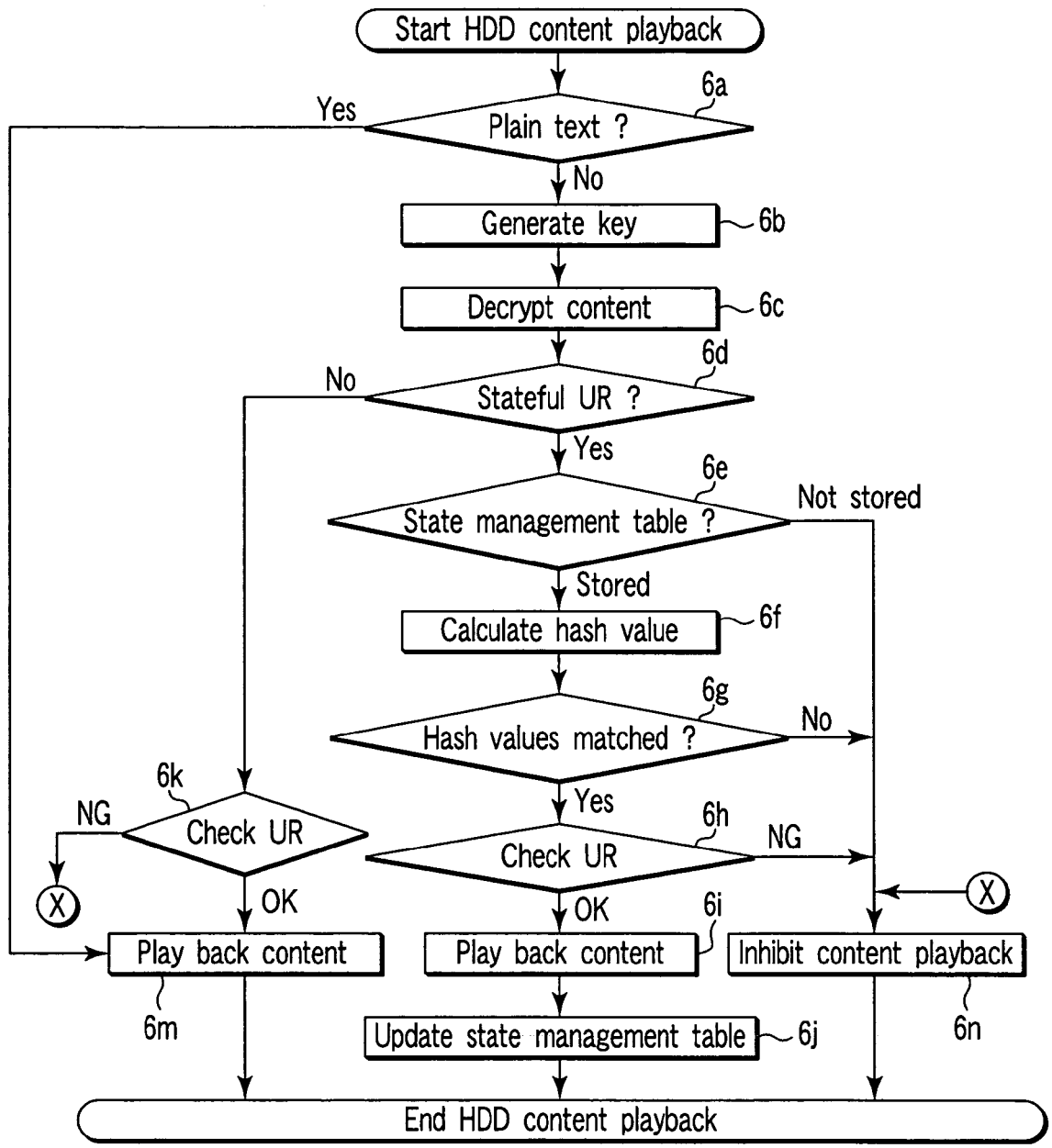
FIG. 6 is a flowchart showing the sequence of a content playback process by the terminal shown in FIG. 1.

The control unit 7A checks in step 6*a* (FIG. 6) if the content to be played back is plain text. If the content to be played back is plain text, the flow jumps to step 6*m*. In step 6*m*, the control unit 7A reads out the content from the HDD 10 and plays it back.

On the other hand, if the content to be played back is encrypted, the control unit 7A generates an encryption key in step 6*b*. The encryption key is generated by the hash calculator/key generator function 33 of the signal processing unit 3 on the basis of the download time appended to the content to be played back, and the telephone number of the mobile terminal. Next, the control unit 7A issues a decryption instruction of the encrypted content to the encryptor/decryptor function 32 of the signal processing unit 3 in step 6*c*, thus decrypting the content to be played back using the generated encryption key.

Upon completion of the decryption process of the content, the control unit 7A checks in step 6*d* if the usage rule included in the decrypted content is a stateless or stateful usage rule. If the usage rule is a stateless usage rule, the control unit 7A checks based on the stateless usage rule in step 6*k* if the validity period is not expired. If the validity period is not expired, the control unit 7A plays back the decrypted content.

By contrast, assume that the usage rule included in the decrypted content is a stateful usage rule. In this case, the control unit 7A checks based on the state ID in step 6*e* if the state management table corresponding to the content to be played back is stored in the internal memory 8. If it is determined as a result of checking that the corresponding state management table is stored, the flow advances to step 6*f*, and the control unit 7A controls the hash calculator/key generator function 33 of the signal processing unit 3 to calculate a hash function value. In this case, the hash function value is calculated based on the download time and state ID appended to the content to be played back, and the usage rule.

The control unit 7A then collates the hash function value calculated from the content with that appended to the state management table 91 in step 6*g*. If the two values match, the control unit 7A checks based on the state information (state) stored in the state management table in step 6*h* if, for example, a remaining playback count is not zero. If the remaining playback count is not zero, the control unit 7A plays back the decrypted content in step 6*i*. After the playback process, the state information (state) stored in the state management table is updated in step 6*j*. For example, if the state information is a playback count, the playback count value is decremented (by 1).

If no state management table corresponding to the content to be played back is stored in the internal memory 8 due to the aforementioned content complete delete process or the like, if the hash function values do not match due to tampering of the usage rule during the backup period, and if the remaining playback count is zero, the control unit 7A inhibits the content from being played back in step 6*n*.

As described above, according to the first embodiment, a content including a usage rule is encrypted, a download time is appended to that encrypted file, and that file is stored in the HDD 10. In addition, if the usage rule is a stateful usage rule, the state management table 91 used to manage the variable state of the use condition is created, and is stored in the internal memory 8 in correspondence with the content using the state ID (State#). When the content is backed up/restored, only the encrypted content and its additional information are backed up/restored by the personal computer PC while leaving the state management table 91 in the internal memory 8.

Therefore, when the content is backed up/restored, the restored encrypted content can be continuously played back in accordance with the latest remaining playback count managed by the state management table 91 on the internal memory 8. That is, the content including the stateful usage rule can be backed up/restored using the personal computer PC of the user himself or herself while adequately managing its variable state.

A hash function value calculated based on the download time and state ID (State#) appended to the content body and the usage rule is appended to the state management table 91, and a hash function value, which is calculated based on the download time and state ID (State#) appended to the content body and the usage rule is collated with that appended to the state management table 91 upon playback. For this reason, even when the usage rule or the like has been tampered with during the backup period, such tampering can be found by collating the hash function values. In such a case, playback of the content can be inhibited.

Furthermore, as the delete mode, the temporary delete mode for the purpose of temporarily saving the content stored in the HDD 10, and the complete delete mode for the purpose of disabling the content stored in the HDD 10 to play it back are prepared. For this reason, content deletion according to the purpose intended can be made.

Moreover, in the description of the first embodiment described above, the backup/restore process is done between the mobile terminal as a backup source and the external terminal. However, the present invention is not limited to this. Even when the mobile terminal as the backup source has been changed to another terminal due to a model change or the like, if the telephone number is inherited between these terminals, the backup file can be restored to the other terminal, and the content with the stateless usage rule can be played back. In other words, when the model change of the terminal has been made, the content with the stateless usage rule can be moved.

In addition, in the first embodiment, when the content stored in the HDD 10 of the mobile terminal is moved to an external storage medium such as a memory card or the like while being terminal-bound (or telephone number-bound), if that content is the one with the stateful usage rule, the corresponding state management table 91 stored in the internal memory 8 of the mobile terminal is deleted. In this way, even when the backup file of the content which has been moved to the external storage medium is restored from the personal computer PC to the HDD 10 of the mobile terminal, since the state management table 91 of the moved content has been deleted from the internal memory 8 of the mobile terminal, playback of the restored backup file is inhibited. In the case of the stateless usage rule, both the restored content and that moved to the memory card can be played back. Since either content is terminal-bound (or telephone number-bound), only one mobile terminal is allowed to play back. Therefore, terminal-bound content movement and backup/restore processes can coexist.

SECOND EMBODIMENT

In the second embodiment of the present invention, upon storing the downloaded content in the HDD, a state management table is created and is stored in the internal memory independently of whether the usage rule included in that content is a stateful or stateless usage rule. As a result, the backup/restore process of the content stored in the HDD and its movement to a memory card can be made.

FIG. 12 is a block diagram showing the arrangement of a mobile terminal as the second embodiment of the information terminal according to the present invention. Note that the same reference numerals in FIG. 12 denote the same parts as those in FIG. 1, and a detailed description thereof will be omitted.

The mobile terminal of this embodiment comprises a media interface 16. This media interface 16 performs a transfer operation for moving a content between a memory card MC and control unit 7B.

The control unit 7B has, as control functions according to this embodiment, a content acquisition/save function 81, table management function 82, content playback function 83, content delete function 84, backup/restore function 85, and content move function 86. Note that these functions 81 to 86 are implemented when the microcomputer executes programs.

The content acquisition/save function 81 executes a series of processes for downloading a content from a content server (not shown), temporarily saving the downloaded content in the internal memory 8, and then moving and storing the content in the HDD 10 after encryption, as in the content acquisition/save function 71 described in the first embodiment.

The table management function 82 executes a process for, when the downloaded content includes a usage rule indicating the content of the use condition, creating a state management table used to manage the use condition, and storing this state management table in the internal memory 8 in association with the content. The state management table and content are associated with each other using a state ID (State#) Also, a hash function value, which is calculated based on the download time, state ID (State#), and usage rule, is appended to the state management table.

The backup/restore function 85 executes a series of processes for transferring the encrypted content stored in the HDD 10 to the personal computer PC via the external interface 13 to make the personal computer PC back it up, and transferring the content from the personal computer PC to the mobile terminal to restore that content to the HDD 10 as needed, as in the backup/restore function 75 described in the first embodiment.

The content delete function 84 executes a delete process of the encrypted content stored in the HDD 10 by selectively using the temporary delete mode and complete delete mode according to the purpose intended, as in content delete function 74 described in the first embodiment.

The content move function 86 executes a process for moving the encrypted content stored in the HDD 10 to the memory card MC. When the encrypted content has been moved to the memory card MC, the function 86 issues an instruction to the table management function 82 to delete the corresponding state management table from the internal memory 8.

The content playback function 83 executes processes for playing back the encrypted content stored in the HDD 10. Upon playing back the encrypted content, the function 83 executes a decryption process of the encrypted content, a checking process for checking if the corresponding state management table is saved, i.e., if the content has been moved, a process for calculating the hash function value, and collating it with the hash function value appended to the state management table, and a checking process for checking the authenticity of correspondence between the content to be played back and state ID (State#).

The operations of the mobile terminal with the above arrangement will be described below.

(1) Content Acquisition/Save Operation

Figure 13:
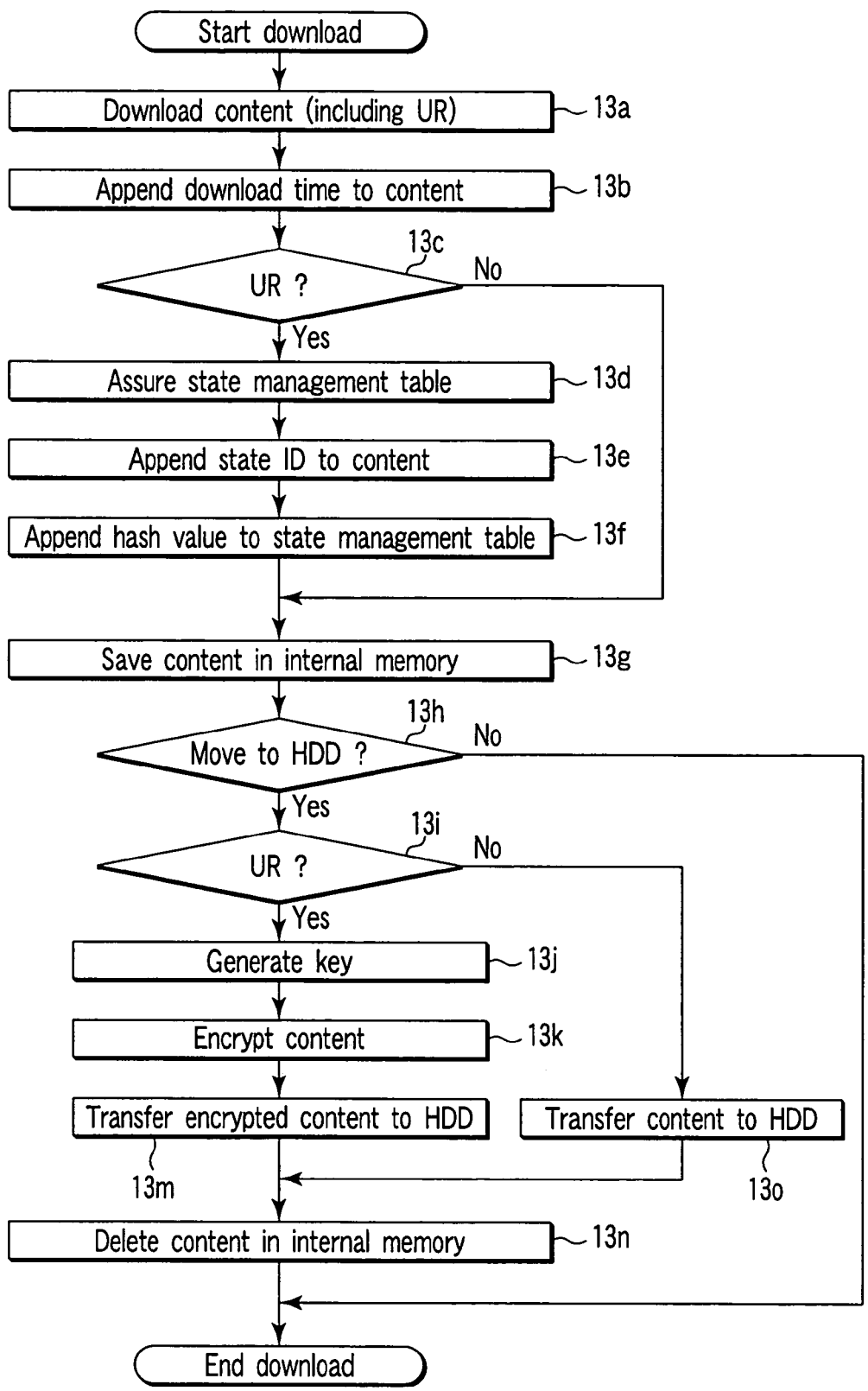
FIG. 13 is a flowchart showing the sequence and content of a content acquisition/save process by the terminal shown in FIG. 12.

The control unit 7B downloads a content from a content server (not shown) in step 13*a*, as shown in FIG. 13. After the content is downloaded, the content acquisition/save function 81 appends a download time to the content in step 13*b*. The control unit 7B checks in step 13*c* if the downloaded content includes a usage rule indicating the content of the use condition. If the content does not include any usage rule, the flow jumps to step 13*g* to save the content appended with the download time in the internal memory 8 intact.

On the other hand, if the content includes the usage rule, the control unit 7B assures a state management table in step 13*d*, and appends state information (e.g., a playback count or remaining playback count (State)) indicating the variable state of the use condition to the content. The control unit 7B generates a state ID (State#) unique to each content, and appends the generated state ID (State#) to the state management table and content in step 13*e*. That is, the control unit 7B associates the state management table and content with each other by this state ID (State#). In step 13*f*, the control unit 7B adds a hash function value to the state management table. This hash function value is calculated by the hash calculator/key generator function 33 of the signal processing unit 3 on the basis of the download time and state ID (State#) appended to the content, and the usage rule.

The control unit 7B saves the content appended with the download time and state ID (State#), and the state management table appended with the state information (State), its ID, and hash function value in the internal memory 8 in step 13*g*.

Note that assurance of the state management table, generation and appending of the state ID (State#), and calculation and appending of the hash function value may be made when the content is moved from the internal memory 8 to the HDD 10. In this way, the storage capacity of the internal memory 8 can be saved until the content is moved to the HDD 10.

For example, when the free capacity of the internal memory 8 becomes lower than a predetermined value while the content and state management table are stored in the internal memory 8, as described above, it is required to move the content to the HDD 10. In this case, the flow advances from step 13h to step 13i, and the control unit 7B checks if the content includes the usage rule indicating the content of the use condition.

If the content includes the usage rule, the control unit 7B generates an encryption key in step 13j, and encrypts the content body, usage rule, and state ID except for the download time using this encryption key in step 13k. Then, the control unit 7B moves the encrypted content body, usage rule, and state ID to the HDD 10 in step 13m. After movement, the control unit 7B deletes the moved download time, content body, usage rule, and state ID from the internal memory 8 in step 13o.

If the content does not include any usage rule indicating the content of the use condition, the flow jumps from step 13i to step 13n, and the control unit 7B moves the content to the HDD 10 without encrypting it. After movement, the control unit 7B deletes the content from the internal memory 8 in step 13o.

(2) Content Backup/Restore Operation

When the content stored in the HDD 10 is to be backed up to the external personal computer PC, the process is executed according to the control sequence shown in FIG. 3, as in the first embodiment. Also, when the backup encrypted content is to be restored to the HDD 10 of the mobile terminal, the process is executed according to the control sequence shown in FIG. 4, as in the first embodiment.

(3) Delete Operation of Content Stored in HDD 10

When the content and its additional information stored in the HDD 10 are to be deleted, it is checked if the content includes the usage rule indicating the content of the use condition. If the content does not include any usage rule, the content to be deleted and its additional information are deleted from the HDD 10.

Figure 16:
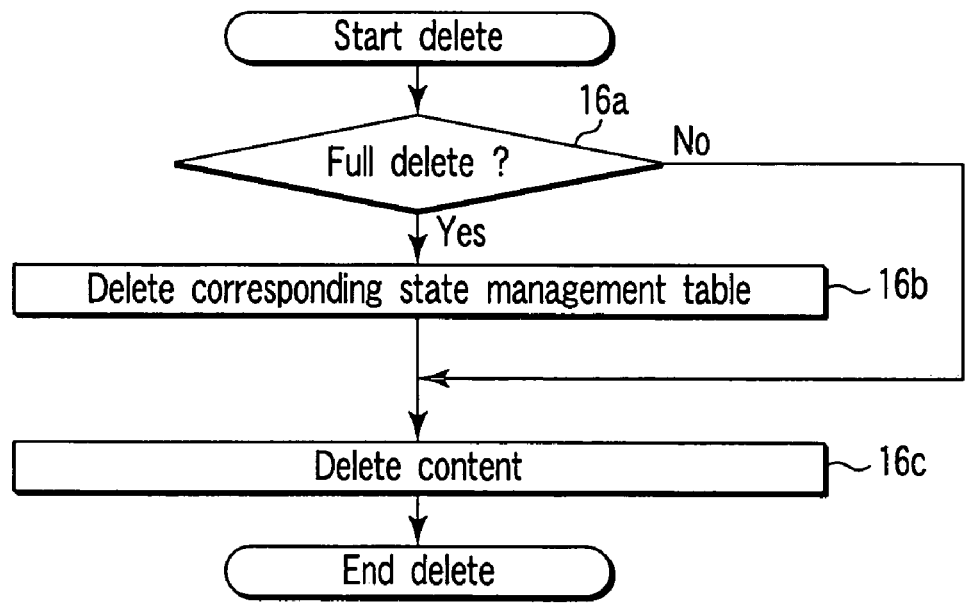
FIG. 16 is a flowchart showing the sequence and content of a content delete process to a memory card by the terminal shown in FIG. 12.

On the other hand, when the content including the usage rule and its additional information are to be deleted, it is checked if the full or temporary delete mode is set as the delete mode, as shown in FIG. 16. If the temporary delete mode is set, the content to be deleted is deleted from the HDD 10 together with its additional information while leaving the state management table on the internal memory. Therefore, in this case, when the deleted content is restored to the HDD 10, this content can be played back on the basis of the state management table in the internal memory.

On the other hand, if the complete delete mode is set, the state management table corresponding to the content to be deleted is deleted from the internal memory 8 in step 16b, and the content to be deleted is deleted from the HDD 10 together with its additional information in step 16c. Therefore, in this case, even when only the content is restored, that content cannot be played back.

(4) Move Operation of Content Stored in HDD 10

Figure 14:
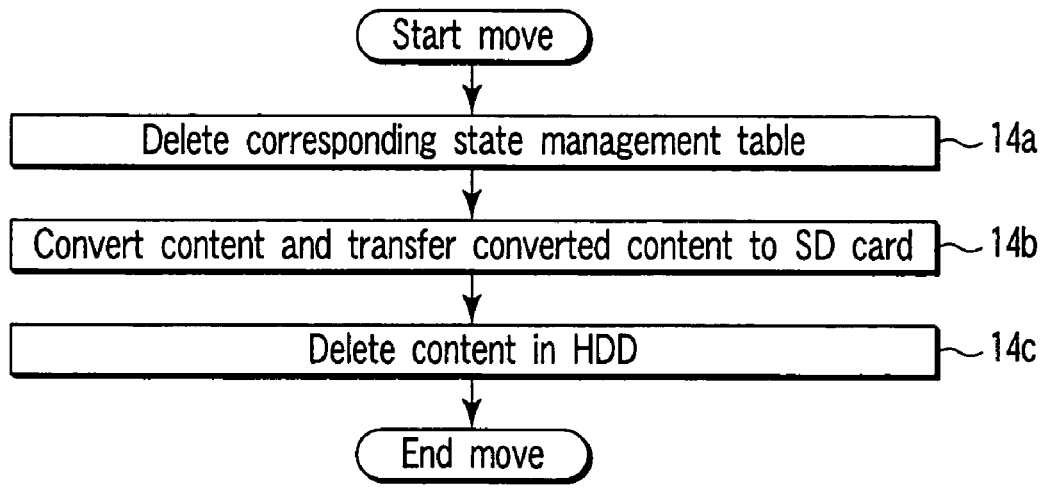
FIG. 14 is a flowchart showing the sequence and content of a content move process to a memory card by the terminal shown in FIG. 12.

When the content stored in the HDD 10 is to be moved to the memory card MC, the control unit 7B deletes the state management table corresponding to the content to be moved from the internal memory 8 in step 14a, as shown in FIG. 14. Subsequently, after the control unit 7B decrypts the encrypted content to be moved, it converts the decrypted content to a format that can be handled by the memory card MC, and moves the converted content to the memory card MC via the media interface 16 in step 14b. Upon completion of movement, the control unit 7B deletes the moved encrypted content from the HDD 10 in step 14c.

(5) Playback Operation of Content Stored in HDD 10

Figure 15:
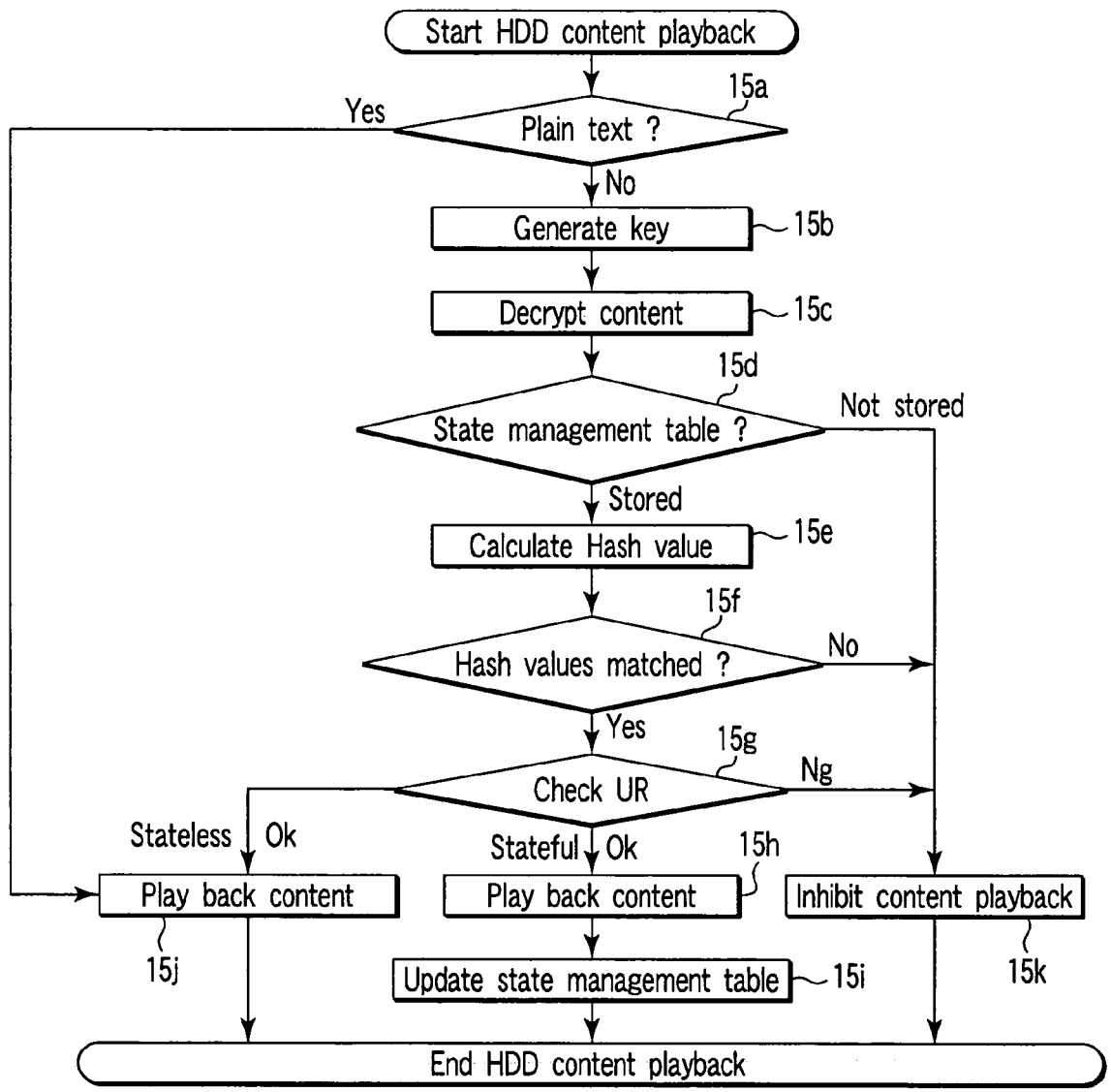
FIG. 15 is a flowchart showing the sequence and content of a content playback process to a memory card by the terminal shown in FIG. 12.

The control unit 7B checks in step 15a (FIG. 15) if the content to be played back is plain text. If the content to be played back is plain text, the flow jumps to step 15j. In step 15j, the control unit 7B reads out the content from the HDD 10 and plays it back.

On the other hand, if the content to be played back is encrypted, the control unit 7B generates an encryption key in step 15b. The encryption key is generated by the hash calculator/key generator function 33 of the signal processing unit 3 on the basis of the download time appended to the content to be played back, and the telephone number of the mobile terminal. Next, the control unit 7B issues a decryption instruction of the encrypted content to the encryptor/decryptor function 32 of the signal processing unit 3 in step 15c, thus decrypting the content to be played back using the generated encryption key.

Upon completion of the decryption process of the content, the control unit 7B checks in step 15d if the state management table corresponding to the content to be played back is stored in the internal memory 8. If it is determined as a result of checking that the corresponding state management table is stored, the flow advances to step 15e, and the control unit 7B controls the hash calculator/key generator function 33 of the signal processing unit 3 to calculate a hash function value. The hash function value is calculated based the download time and state ID appended to the content to be played back, and the usage rule.

The control unit 7B then collates the hash function value calculated from the content to be played back with that appended to the state management table in step 15f. If the two values match, the control unit 7B checks based on the state information (state) stored in the state management table in step 15g if a playback requirement is met.

For example, in the case of the content including the stateless usage rule, it is checked based on that stateless usage rule if the validity period is not expired. If the validity period is not expired, the control unit 7B plays back the decrypted content in step 15j. On the other hand, in case of the content including the stateful usage rule, it is checked if a remaining playback count is not zero. If the remaining playback count is not zero, the control unit 7B plays back the decrypted content in step 15h. After the playback process, the state management table is updated in step 15i.

If the state management table corresponding to the content to be played back has been deleted from the internal memory 8 due to the aforementioned content complete delete process, content move process, or the like, if the hash function values do not match due to tampering of the usage rule during the backup period, and if the valid period has been expired or a remaining playback count is zero, the control unit 7B inhibits the content from being played back in step 15k.

As described above, according to the second embodiment, upon storing the downloaded content in the HDD 10, it is checked if the content includes the usage rule. If the content includes the usage rule, a state management table is created and is saved in the internal memory 8. More specifically, when the usage rule indicating the use condition included in the content is a stateless usage rule as well as a stateful usage rule, the state management table is created and is saved in the internal memory 8. Upon moving the content stored in the HDD 10 to the memory card MC, the state management table is deleted from the internal memory 8.

Therefore, when the content is backed up/restored as in the first embodiment, the restored encrypted content can be continuously played back in accordance with the latest remaining playback count managed by the state management table on the internal memory 8. That is, the content including the stateful usage rule can be backed up/restored using the personal computer PC of the user himself or herself while adequately managing its variable state.

In addition, when the content is moved to the memory card MC independently of whether the content includes the stateful usage rule or stateless usage rule, playback of that content is inhibited even when its backup file is restored. That is, not only the backup/restore process and terminal-bound content movement can coexist, but also the backup/restore process and media-bound content movement can coexist for the content including the usage rule indicating the content of the use condition.

THIRD EMBODIMENT

In the third embodiment of the present invention, upon storing the downloaded content in the HDD, it is checked if the usage rule included in that content is a stateful usage rule. If the usage rule is a stateful usage rule, a state management table is created and is stored in the internal memory 8. Upon moving the content stored in the HDD to the memory card, a move management table is created and is stored in the internal memory. That is, the backup/restore process of the content stored in the HDD and movement to the memory card are allowed.

Note that the mobile terminal according to the third embodiment has the same arrangement as that shown in FIG. 12 described in the second embodiment. Hence, only functional differences from the second embodiment will be explained, and a description except for these differences will be omitted.

When the downloaded content includes a stateful usage rule, the table management function of the third embodiment creates a state management table used to manage the variable state of the use condition, and stores that state management table in the internal memory 8 in association with the content. The state management table and content are associated with each other using a state ID (State#). A hash function value is assigned to the state management table. This hash function value is calculated by the hash calculator/key generator function 33 of the signal processing unit 3 on the basis of the download time, state ID (State#), and usage rule. Note that a part of the content body may be considered upon calculating the hash function value.

Furthermore, when the downloaded content is moved from the HDD 10 to the memory card MC, the table management function of this embodiment sets a flag in information indicating the move state in a move management table.

The operations of the mobile terminal with the above arrangement will be explained below.

(1) Content Acquisition/Save Operation

The control unit 7B downloads content from a content server (not shown) in step 17*a*, as shown in FIG. 17. After the content is downloaded, the control unit 7B appends a download time to the content in step 17*b*. The control unit 7B checks in step 17*c* if the format of the usage rule is a stateless usage rule or stateful usage rule.

If it is determined as a result of checking that the usage rule is a stateful usage rule, the control unit 7B assures a state management table in step 17*d*, and appends state information (e.g., a playback count or remaining playback count [state]) indicating the variable state of the use condition to the content. The control unit 7B generates a state ID (State#) unique to each content, and appends the generated state ID (State#) to the state management table and content in step 17*e*. That is, the control unit 7B associates the state management table and content with each other by this state ID (State#). In step 17*f*, the control unit 7B adds a hash function value to the state management table. This hash function value is calculated by the hash calculator/key generator function 33 of the signal processing unit 3 on the basis of the download time and state ID (State#) appended to the content, and the usage rule.

Figure 20:
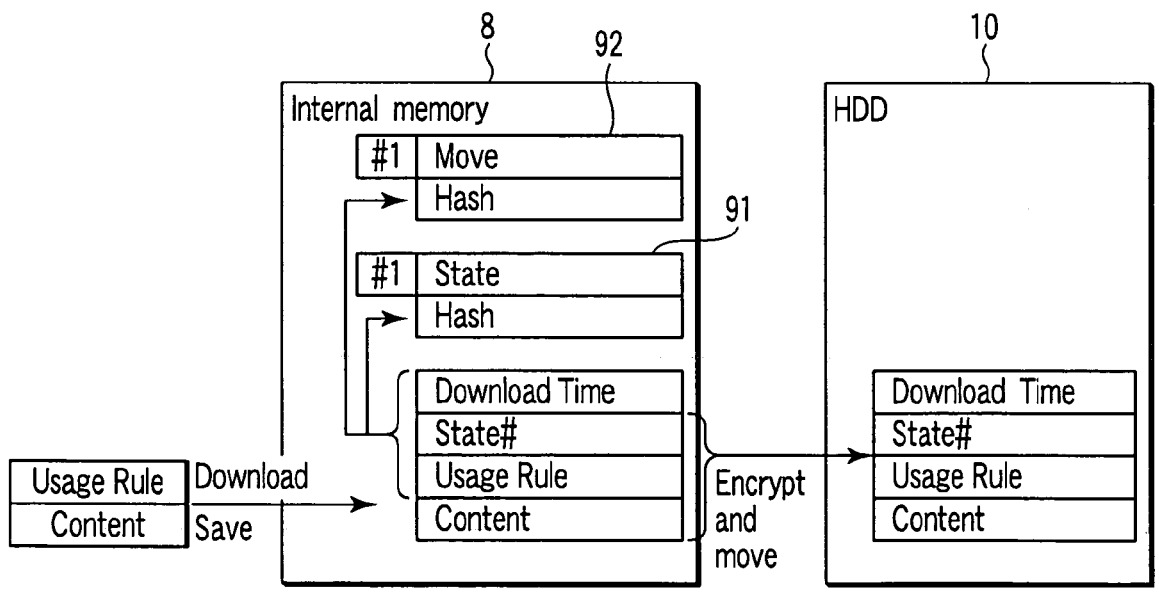
FIG. 20 is a view for explaining an operation for moving content including a stateful usage rule from an internal memory to an HDD by the terminal according to the third embodiment of the present invention.

The flow then advances to step 17*g*. In step 17*g*, the control unit 7B assures a move management table, and appends the state ID (State#) indicating the correspondence with the content to this move management table. In step 17*h*, the control unit 7B appends the previously calculated hash function value to the move management table. The flow advances to step 17*i*, and the control unit 7B saves the content appended with the download time and state ID (State#), the state management table appended with the state information (State), its ID, and hash function value, and the move management table appended with the state ID (State#) and hash function value in the internal memory 8. FIG. 20 shows an example of the save result of the content, state management table, and move management table.

On the other hand, if it is determined as a result of checking in step 17*c* that the usage rule is a stateless usage rule, the flow jumps to step 17*g* to skip the state management creation process in steps 17*d* to 17*f*, and the control unit 7B creates a move management table in steps 17*g* to 17*i*. In step 17*i*, the control unit 7B saves the content appended with the download time and state ID (State#), and the move management table appended with the state ID (State#) and hash function value in the internal memory 8.

Note that assurance of the state management table, generation and appending of the state ID (State#), and calculation and appending of the hash function value may be made when the content is moved from the internal memory 8 to the HDD 10. Also, assurance of the move management table, and appending of the state ID (State#) and hash function value may be made when the content is moved from the HDD 10 to the memory card MC. In this way, the storage capacity of the internal memory 8 can be saved until the content is moved to the HDD 10 and until the content is moved from the HDD 10 to the memory card MC.

For example, when the free capacity of the internal memory 8 becomes lower than a predetermined value while the content, state management table 91, and move management table are stored, as described above, it is required to move the content to the HDD 10. In this case, the flow advances from step 17*j* to step 17*k*, and the control unit 7B checks if the content includes the usage rule indicating the content of the use condition.

If the content includes the usage rule, the control unit 7B generates an encryption key in step 17*m*, and encrypts the content body, usage rule, and state ID except for the download time using this encryption key in step 17*n*. Then, the control unit 7B moves the encrypted content body, usage rule, and state ID to the HDD 10, as shown in FIG. 20, in step 17*o*. After movement, the control unit 7B deletes the content and its additional information from the internal memory 8 in step 17*p*.

If the content does not include any usage rule indicating the content of the use condition, the flow jumps from step 17*k* to step 17*q*, and the control unit 7B moves the content to the HDD 10 without encrypting it. After movement, the control unit 7B deletes the content and its additional information from the internal memory 8 in step 17p.

(2) Content Backup/Restore Operation

When the content stored in the HDD 10 is to be backed up to the external personal computer PC, the process is executed according to the control sequence shown in FIG. 3, as in the first embodiment. Also, when the backup encrypted content is to be restored to the HDD 10 of the mobile terminal, the process is executed according to the control sequence shown in FIG. 4, as in the first embodiment.

(3) Delete Operation of Content Stored in HDD 10

When the content and its additional information stored in the HDD 10 are to be deleted, it is checked if the usage rule included in the content to be deleted is a stateful usage rule. If it is determined as a result of checking if the usage rule is a stateless usage rule, the content to be deleted and its additional information are deleted from the HDD 10.

On the other hand, if the usage rule included in the content to be deleted is a stateful usage rule, it is checked if the complete or temporary delete mode is set as the delete mode. If the temporary delete mode is set, the content to be deleted and its additional information are deleted from the HDD 10 while leaving the state management table on the internal memory. Therefore, in this case, when the deleted content is restored to the HDD 10, this content can be played back.

On the other hand, if the complete delete mode is set, the state management table and move management table corresponding to the content to be deleted are deleted from the internal memory 8, and the content to be deleted and its additional information are deleted from the HDD 10. Therefore, in this case, even when the content is restored, that content cannot be played back.

(4) Move Operation of Content Stored in HDD 10

Figure 18:
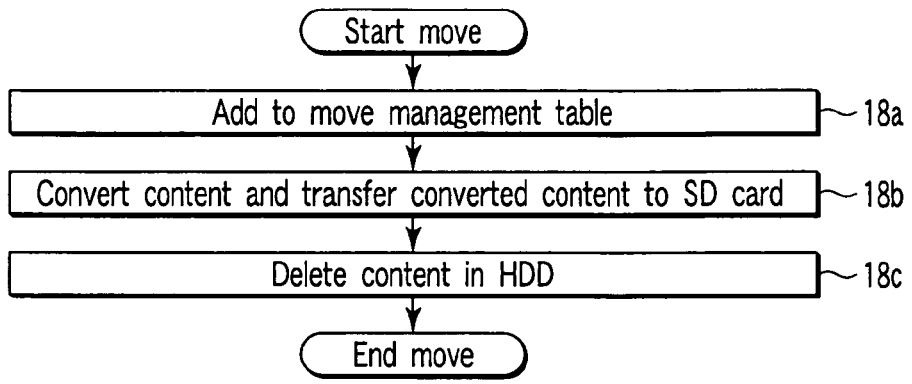
FIG. 18 is a flowchart showing the sequence and content of a content move process to a memory card by the terminal according to the third embodiment of the present invention.

When the content stored in the HDD 10 is to be moved to the memory card MC, the control unit 7B sets a flag "1" indicating movement in the move management table assured in the internal memory 8 in step 18a, as shown in FIG. 18. Also, the control unit 7B deletes the state management table corresponding to the content to be moved from the internal memory 8. After the control unit 7B decrypts the encrypted content to be moved, it converts the decrypted content to a format that can be handled by the memory card MC, and moves the converted content to the memory card MC via the media interface 16 in step 18b. Upon completion of movement, the control unit 7B deletes the moved encrypted content from the HDD 10 together with its additional information in step 18c.

(5) Playback Operation of Content Stored in HDD 10

Figure 19:
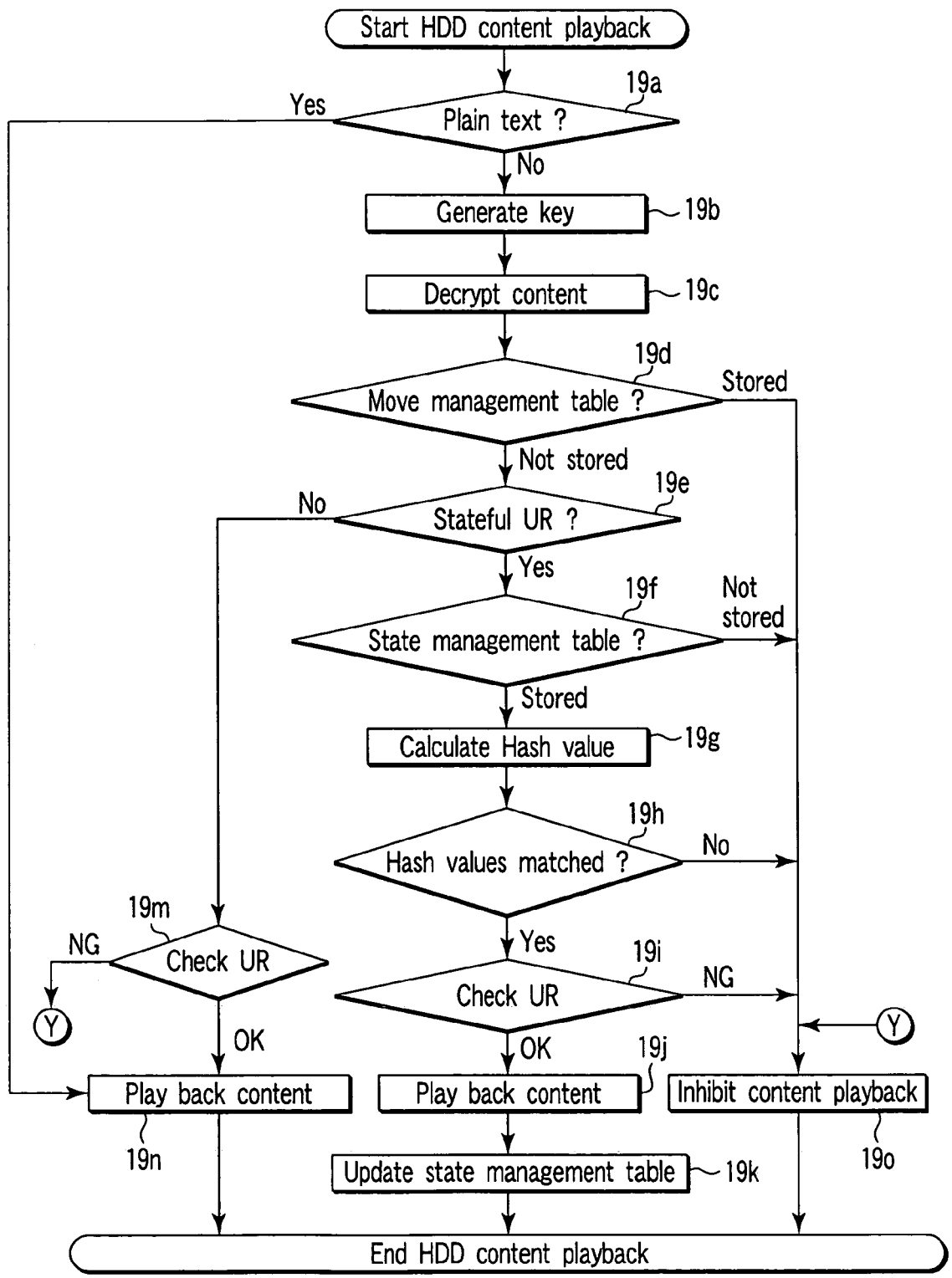
FIG. 19 is a flowchart showing the sequence and content of a content playback process to a memory card by the terminal according to the third embodiment of the present invention.

The control unit 7B checks in step 19a (FIG. 19) if the content to be played back is plain text. If the content to be played back is plain text, the flow jumps to step 19n. In step 19n, the control unit 7B reads out the content from the HDD 10 and plays it back.

On the other hand, if the content to be played back is encrypted, the control unit 7B generates an encryption key in step 19b. The encryption key is generated by the hash calculator/key generator function 33 of the signal processing unit 3 on the basis of the download time appended to the content to be played back, and the telephone number of the mobile terminal. Next, the control unit 7B issues a decryption instruction of the encrypted content to the encryptor/decryptor function 32 of the signal processing unit 3 in step 19c, thus decrypting the content to be played back using the generated encryption key.

Upon completion of the decryption process of the content, the control unit 7B checks in step 19d if the move management table 92 corresponding to the content to be played back is stored in the internal memory 8. If it is determined as a result of checking that the corresponding move management table is stored, the control unit 7B checks in step 19e if the usage rule included in the decrypted content is a stateless or stateful usage rule. If the usage rule is a stateless usage rule, the control unit 7B checks based on that stateless usage rule in step 19m if the validity period is not expired. If the validity period is not expired, the control unit 7B plays back the decrypted content in step 19n.

On the other hand, in case of the content including the stateful usage rule, the control unit 7B checks in step 19f if the state management table corresponding to the content to be played back is stored in the internal memory 8. If it is determined as a result of checking that the corresponding state management table is stored, the flow advances to step 19g, and the control unit 7B controls the hash calculator/key generator function 33 of the signal processing unit 3 to calculate a hash function value. In this case, the hash function value is calculated based the download time and state ID (State#) appended to the content to be played back, and the usage rule.

The control unit 7B then collates the hash function value calculated from the content with that appended to the state management table in step 19h. If the two values match, the control unit 7B checks based on the state information (State) stored in the state management table in step 19i if, for example, a remaining playback count is not zero. If the remaining playback count is not zero, the control unit 7B plays back the decrypted content in step 19j. After the playback process, the control unit 7B updates the state management table in step 19k.

If the flag "1" is set in the move management table 92 upon movement of the content to the memory card MC, if neither the state management table 91 nor the move management table 92 corresponding to the content to be played back is stored in the internal memory 8 due to the aforementioned content complete delete process or the like, if the hash function values do not match due to tampering of the usage rule during the backup period, and if the remaining playback count is zero, the flow advances to step 19o, and the control unit 7B inhibits the content from being played back.

As described above, according to the third embodiment, when the content is backed up/restored, the restored encrypted content can be continuously played back by reflecting the variable state of the content before backup on the basis of the state management table 91 stored in the internal memory 8. That is, the content including the stateful usage rule can be backed up/restored using the personal computer PC of the user himself or herself.

In the third embodiment, the move management table 92 is prepared independently of the state management table 91. When the content stored in the HDD 10 is moved to the memory card MC, the flag "1" is set in the move management table 91. For this reason, even when the backup file of the content is restored from the personal computer PC to the HDD 10 after movement of the content, its playback can be inhibited.

That is, the backup/restore process and terminal-bound content movement can coexist, and the backup/restore process and media-bound content movement can coexist for a content assigned the stateful usage rule and that assigned the stateless usage rule.

COMPARISON OF RESPECTIVE EMBODIMENTS

Figure 21:
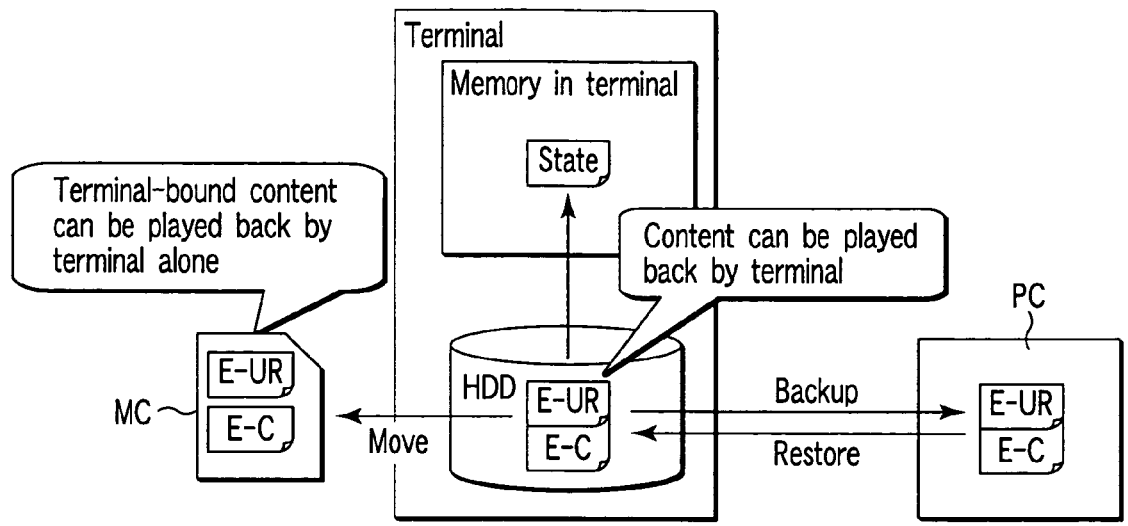
FIG. 21 is a view showing the relationship between terminal-bound content and backup/restore process.
Figure 22:
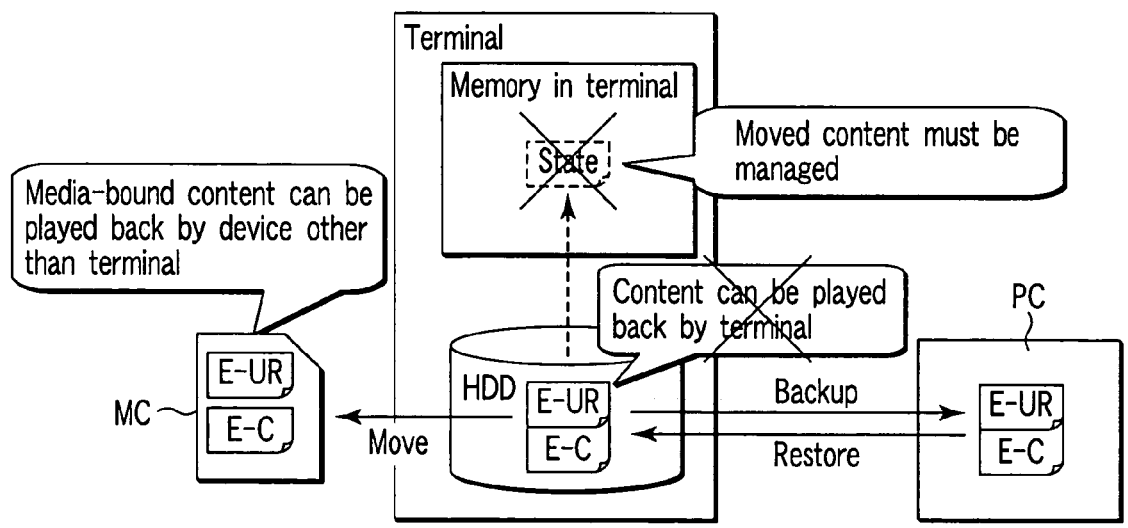
FIG. 22 is a view showing the relationship between media-bound content and backup/restore process.

FIG. 23 shows a list of the effects of the first, second, and third embodiments described above. That is, the first embodiment assumes terminal-bound content movement, and allows coexistence of the content backup/restore process and terminal-bound content movement. The second and third embodiments assume not only terminal-bound content movement but also media-bound content movement, and allow coexistence of the content backup/restore process, and terminal-bound and media-bound content movement processes. Note that FIG. 21 shows the relationship between the terminal-bound content movement and backup/restore process, and FIG. 22 shows the relationship between the media-bound content movement and backup/restore process.

OTHER EMBODIMENTS

In each of the above embodiments, the hard disk 10 is used as the first storage area that can be accessed by the external terminal. Alternatively, a RAM, flash memory, or the like may be used as the first storage area. Also, the information terminal is not limited to the mobile terminal such as the mobile telephone, PDA, or the like, and a personal computer, television receiver, game machine, audio/video player, digital camera, and the like may be used.

Furthermore, in each of the above embodiments, the content is downloaded and stored from a content server via a communication line. Alternatively, the content may be loaded and stored from a rented external storage medium such as a memory card, magnetic disk, optical disk, or the like, or a pay content or a content that allows a limited number of copies may be loaded and stored from a terminal such as another personal computer via a cable, infrared interface, wireless interface, or the like.

In brief, the present invention can be embodied by modifying required constituent elements without departing from the scope of the invention when it is practiced. Also, various inventions can be formed by appropriately combining a plurality of required constituent elements disclosed in the respective embodiments. For example, some required constituent elements may be deleted from all required constituent elements disclosed in the respective embodiments. Furthermore, required constituent elements across different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information terminal comprising:
a storage unit configured to have a first storage area which is accessible from an external terminal, and a second storage area which is inaccessible from the external terminal;
an acquiring module configured to acquire content which includes a content body and rights information indicating a use condition of the content body;
a temporarily storing module configured to temporarily store the acquired content in the second storage area;
an encrypting and moving module configured to, if a predetermined move condition is satisfied, encrypt the temporarily stored content, and move the encrypted content from the second storage area to the first storage area;
a generating and appending module configured to, if the acquired content is stored in the second storage area, generate state management information corresponding to the acquired content, and append the generated state management information to the acquired content; and
a storing and appending module configured to, if the acquired content stored in the second storage area is moved to the first storage area, separate the state management information from the acquired content to be moved, store the separated state management information in the second storage area, and append information indicating correspondence between the separated state management information and the acquired content to be moved to the acquired content to be moved.

2. The information terminal according to claim 1, wherein the generating and appending module comprises:
a module configured to determine if the rights information included in the acquired content is one of first rights information which does not require managing a variable state of the use condition, and second rights information which requires managing the variable state of the use condition; and
a module configured to, if it is determined that the rights information included in the acquired content is the second rights information, generate the state management information used to manage the variable state of the use condition of the content body.

3. The information terminal according to claim 2, further comprising:
a module configured to decrypt the encrypted content stored in the first storage area;
a module configured to determine if the rights information included in the decrypted content is one of the first rights information and the second rights information;
a module configured to, if it is determined that the rights information included in the acquired content is the second rights information, determine if the second storage area stores the state management information corresponding to the decrypted content;
a module configured to, if it is determined that the second storage area stores the corresponding state management information, determine based on the corresponding state management information if the decrypted content satisfies a playback requirement;
a module configured to, if it is determined that the decrypted content satisfies the playback requirement, playback the decrypted content; and
a module configured to update the corresponding state management information.

4. The information terminal according to claim 1, wherein the generating and appending module comprises:
a module configured to determine if the acquired content includes the rights information; and
a module configured to, when it is determined that the acquired content includes the rights information, generate the state management information used to manage a variable state of the use condition of the content body; and
wherein the storing and appending module comprises a module configured to, when a process for moving the encrypted content stored in the first storage area to an external storage apparatus has been performed, delete the state management information corresponding to the encrypted content from the second storage area.

5. The information terminal according to claim 4, further comprising:
a module configured to decrypt the encrypted content stored in the first storage area;
a module configured to determine if the second storage area stores the state management information corresponding to the decrypted content;
a module configured to, if it is determined that the second storage area stores the corresponding state management information, check based on the corresponding state management information if the decrypted content satisfies a playback requirement;
a module configured to, if it is determined that the decrypted content satisfies the playback requirement, playback the decrypted content; and
a module configured to update the corresponding state management information.

6. The information terminal according to claim 1,
wherein the generating and appending module comprises:
a module configured to determine if the rights information included in the acquired content is one of first rights information which does not require managing a variable state of the use condition, and second rights information which requires managing the variable state of the use condition; and
a module configured to, if it is determined that the rights information included in the acquired content is the second rights information, generate the state management information used to manage the variable state of the use condition of the content body; and
wherein the storing and appending module comprises:
a module configured to, when a process for moving the encrypted content stored in the first storage area to an external storage apparatus has been performed, delete the state management information corresponding to the encrypted content from the second storage area; and
a module configured to, when the process for moving the encrypted content stored in the first storage area to the external storage apparatus has been performed, generate move management information including a move history indicating that the encrypted content is moved, and store the generated move management information in the second storage area.

7. The information terminal according to claim 6, further comprising:
a module configured to decrypt the encrypted content stored in the first storage area;
a module configured to determine if the move management information stored in the second storage area includes the move history of the encrypted content;
a module configured to, if it is determined that the move management information does not include the move history, determine if the rights information included in the decrypted content is one of the first rights information and the second rights information;
a module configured to, if it is determined that the rights information included in the decrypted content is the second rights information, determine if the state management information corresponding to the decrypted content is stored in the second storage area;
a module configured to, if it is determined that the corresponding state management information is stored in the second storage area, determine based on the corresponding state management information if the decrypted content satisfies a playback requirement;
a module configured to, if it is determined that the decrypted content satisfies the playback requirement, playback the decrypted content; and
a module configured to update the corresponding state management information.

8. An information terminal comprising:
a storage unit configured to have a first storage area which is accessible from an external terminal, and a second storage area which is inaccessible from the external terminal;
an acquiring module configured to acquire content which includes a content body and rights information indicating a use condition of the content body;
a storage control module configured to encrypt the acquired content and store the encrypted content in the first storage area;
a first determining module configured to determine if the rights information included in the acquired content is one of first rights information which does not require managing a variable state of the use condition, and second rights information which requires managing the variable state of the use condition;
a generating and storing module configured to, if it is determined that the rights information included in the acquired content is the second rights information, generate state management information used to manage the variable state of the use condition of the content body, and store the generated state management information in the second storage area;
a decrypting module configured to decrypt the encrypted content stored in the first storage area;
a second determining module configured to determine if the rights information included in the decrypted content is one of the first rights information and the second rights information;
a third determining module configured to, if it is determined that the rights information included in the acquired content is the second rights information, determine if the second storage area stores the state management information corresponding to the decrypted content;
a fourth determining module configured to, if it is determined that the second storage area stores the corresponding state management information, determine based on the corresponding state management information if the decrypted content satisfies a playback requirement;
a playing back module configured to, if it is determined that the decrypted content satisfies the playback requirement, playback the decrypted content; and
an updating module configured to update the corresponding state management information;
wherein the fourth determining module comprises:
a module configured to generate information unique to each acquired content, append the generated unique information to the acquired content, and store the appended content in the first storage area;
a module configured to calculate a first function value based on the rights information included in the acquired content and the unique information appended to the acquired content, and append the calculated first function value to the state management information corresponding to the acquired content;

a module configured to calculate a second function value based on the rights information included in the decrypted content and the unique information appended to the decrypted content, and collate the calculated second function value with the first function value appended to the state management information corresponding to the decrypted content; and a module configured to, if the second function value matches the first function value, determine based on the corresponding state management information if the playback requirement is satisfied.

9. An information terminal comprising:

a storage unit configured to have a first storage area which is accessible from an external terminal, and a second storage area which is inaccessible from the external terminal;

an acquiring module configured to acquire content which includes a content body and rights information indicating a use condition of the content body;

a storage control module configured to encrypt the acquired content and store the encrypted content in the first storage area;

a first determining module configured to determine if the acquired content includes rights information;

a generating and storing module configured to, when it is determined that the acquired content includes the rights information, generate state management information used to manage a variable state of the use condition of the content body, and store the generated state management information in the second storage area;

a deleting module configured to, when a process for moving the encrypted content stored in the first storage area to an external storage apparatus has been performed, delete the state management information corresponding to the encrypted content from the second storage area;

a decrypting module configured to decrypt the encrypted content stored in the first storage area;

a second determining module configured to determine if the second storage area stores the state management information corresponding to the decrypted content;

a checking module configured to, if it is determined that the second storage area stores the corresponding state management information, check based on the corresponding state management information if the decrypted content satisfies a playback requirement;

a playing back module configured to, if it is determined that the decrypted content satisfies the playback requirement, playback the decrypted content; and an updating module configured to update the corresponding state management information;

wherein the checking module comprises:

a module configured to generate information unique to each acquired content, append the generated unique information to the acquired content, and store the appended content in the first storage area;

a module configured to calculate a first function value based on the rights information included in the acquired content and the unique information appended to the acquired content, and append the calculated first function value to the state management information corresponding to the acquired content;

a module configured to calculate a second function value based on the rights information included in the decrypted content and the unique information appended to the decrypted content, and collate the calculated second function value with the first function value appended to the state management information corresponding to the decrypted content; and a module configured to, if the second function value matches the first function value, determine based on the corresponding state management information if the playback requirement is satisfied.

10. An information terminal comprising:

a storage unit configured to have a first storage area which is accessible from an external terminal, and a second storage area which is inaccessible from the external terminal;

an acquiring module configured to acquire content which includes a content body and rights information indicating a use condition of the content body;

a storage control module configured to encrypt the acquired content and store the encrypted content in the first storage area;

a first determining module configured to determine if the rights information included in the acquired content is one of first rights information which does not require managing a variable state of the use condition, and second rights information which requires managing the variable state of the use condition;

a first generating and storing module configured to, if it is determined that the rights information included in the acquired content is the second rights information, generate state management information used to manage the variable state of the use condition of the content body, and store the generated state management information in the second storage area;

a deleting module configured to, when a process for moving the encrypted content stored in the first storage area to an external storage apparatus has been performed, delete the state management information corresponding to the encrypted content from the second storage area;

a second generating and storing module configured to generate move management information including a move history indicating whether the encrypted content has been moved, and store the generated move management information in the second storage area;

a decrypting module configured to decrypt the encrypted content stored in the first storage area;

a second determining module configured to determine if the move management information stored in the second storage area includes the move history of the encrypted content;

a third determining module configured to, if it is determined that the move management information does not include the move history, determine if the rights information included in the decrypted content is one of the first rights information and the second rights information;

a fourth determining module configured to, if it is determined that the rights information included in the decrypted content is the second rights information, determine if the state management information corresponding to the decrypted content is stored in the second storage area;

a fifth determining module configured to, if it is determined that the corresponding state management information is stored in the second storage area, determine based on the corresponding state management information if the decrypted content satisfies a playback requirement;

a playing back module configured to, if it is determined that the decrypted content satisfies the playback requirement, playback the decrypted content; and a updating module configured to update the corresponding state management information;

wherein the fifth determining module comprises:
a module configured to generate information unique to each acquired content, append the generated unique information to the acquired content, and store the appended content in the first storage area;
a module configured to calculate a first function value based on the rights information included in the acquired content and the unique information appended to the acquired content, and append the calculated first function value to the state management information corresponding to the acquired content;
a module configured to calculate a second function value based on the rights information included in the decrypted content and the unique information appended to the decrypted content, and collate the calculated second function value with the first function value appended to the state management information corresponding to the decrypted content; and
a module configured to, if the second function value matches the first function value, determine based on the corresponding state management information if the playback requirement is satisfied.

11. A method for managing content in an information terminal which comprises a storage unit configured to have a first storage area which is accessible from an external terminal, and a second storage area which is inaccessible from the external terminal, the method comprising:
acquiring the content which includes a content body and rights information indicating a use condition of the content body;
temporarily storing the acquired content in the second storage area;
if a predetermined move condition is satisfied, encrypting the temporarily stored content, and moving the encrypted content from the second storage area to the first storage area;
if the acquired content is stored in the second storage area, generating state management information corresponding to the acquired content, and appending the generated state management information to the acquired content; and
if the acquired content stored in the second storage area is moved to the first storage area, separating the state management information from the acquired content to be moved, storing the separated state management information in the second storage area, and appending information indicating correspondence between the separated state management information and the acquired content to be moved to the acquired content to be moved.

12. An information terminal comprising:
a storage unit configured to have a first storage device which is externally accessible, and a second storage device which is externally inaccessible;
an acquiring module configured to acquire content which includes a content body and rights information indicating a use condition of the content body;
an encryption unit which encrypts the acquired content;
a determining unit configured to determine if the rights information included in the acquired content is one of first rights information which does not require managing a variable state of the use condition, and second rights information which requires managing the variable state of the use condition, wherein the use condition included in the first rights information is a condition limiting a reproduction period and the use condition included in the second rights information is a condition limiting a number of times of reproduction;
a calculating module configured to, if it is determined that the rights information included in the acquired content is the second rights information, calculate a first check value, by using at least the use condition, which is used for verifying accordance of the second rights information and which is used to manage the variable state of the use condition of the content body;
a storage control unit configured to: (i) store the encrypted content and the first check value into the second storage device if the rights information is the second rights information, and (ii) store the encrypted content into the second storage device if the rights information is the first rights information;
a moving control unit configured to move the encrypted content to the first storage device;
a checking unit configured to check whether the first check value stored in the second storage device accords with a second check value calculated by using at least the use condition stored in the first storage device; and
a reproduction control unit configured to allow reproduction of the content body stored in the first storage device if the rights information is the first rights information and the use condition is satisfied, or if the rights information is the second rights information, accordance of the first check value with the second check value is detected by the checking unit, and the use condition is satisfied,
wherein, when the rights information is the second rights information and a process for moving the encrypted content stored in the first storage device to an external storage apparatus has been performed, the first check value corresponding to the encrypted content is deletable from the second storage device and move management information including a move history indicating that the encrypted content is moved is generated and stored in the second storage device.

13. The information terminal according to claim 12, further comprising:
a decrypting unit configured to decrypt the encrypted content if the reproduction control unit allows the reproduction; and
an updating unit configured to update the use condition of the second rights information if the reproduction control unit allows the reproduction of the content body having the second rights information;
wherein the calculating unit calculates the first check value by using the updated use condition.

14. A method for managing acquired content in an information terminal which comprises a storage unit including a first storage device which is externally accessible, and a second storage device which is externally inaccessible, the method comprising:
acquiring the content which includes a content body and rights information indicating a use condition of the content body;
encrypting the acquired content;
determining if the rights information included in the acquired content is one of first rights information which does not require managing a variable state of the use condition, and second rights information which requires managing the variable state of the use condition, wherein the use condition included in the first rights information is a condition limiting a reproduction period and the use condition included in the second rights information is a condition limiting a number of times of reproduction;

if it is determined that the rights information included in the acquired content is the second rights information, calculating a first check value, by using at least the use condition, which is used for verifying accordance of the second rights information, and which is used to manage the variable state of the use condition of the content body;

storing the encrypted content and the first check value into the second storage device if the rights information is the second rights information, and storing the encrypted content into the second storage device if the rights information is the first rights information;

moving the encrypted content to the first storage device;

checking whether the first check value stored in the second storage device accords with a second check value calculated by using at least the use condition stored in the first storage device;

allowing reproduction of the content body stored in the first storage device if the rights information is the first rights information and the use condition is satisfied, or if the rights information is the second rights information, accordance of the first check value with the second check value is detected by the checking, and the use condition is satisfied;

when the rights information is the second rights information and a process for moving the encrypted content stored in the first storage device to an external storage apparatus has been performed, deleting the first check value corresponding to the encrypted content from the second storage device and generating move management information including a move history indicating that the encrypted content is moved and storing the generated move management information in the second storage device.

15. The method according to claim 14, further comprising:

decrypting the encrypted content if the reproduction is allowed; and updating the use condition of the second rights information if the content body whose reproduction is allowed has the second rights information;

wherein the first check value is calculated by using the updated use condition.

* * * * *